United States Patent
Cui et al.

(10) Patent No.: US 11,159,357 B1
(45) Date of Patent: Oct. 26, 2021

(54) EFFICIENT RELIABLE COMMUNICATION WITH SUPERIMPOSED TRANSMISSIONS

(71) Applicant: UVic Industry Partnerships Inc., Victoria (CA)

(72) Inventors: Wen Cui, Xi'an (CN); Lin Cai, Victoria (CA)

(73) Assignee: UVic Industry Partnerships Inc., Victoria (CA)

( * ) Notice: Subject to any disclaimer, the term of this patent is extended or adjusted under 35 U.S.C. 154(b) by 0 days.

(21) Appl. No.: 17/209,072

(22) Filed: Mar. 22, 2021

(51) Int. Cl.
*H04L 27/26* (2006.01)
*H04L 27/34* (2006.01)

(52) U.S. Cl.
CPC ...... *H04L 27/3444* (2013.01); *H04L 27/2613* (2013.01); *H04L 27/2657* (2013.01); *H04L 27/2695* (2013.01); *H04L 27/3455* (2013.01)

(58) Field of Classification Search
CPC .. H04B 7/02; H04J 11/00; H04K 1/10; H04K 7/04; H04K 7/08; H04K 7/10; H04L 1/02; H04L 5/00; H04L 9/08; H04L 12/18; H04L 27/00; H04L 27/12; H04L 27/26; H04L 27/2613; H04L 27/2657; H04L 27/2695; H04L 27/3444; H04L 27/3455
USPC ........ 370/203, 206, 210; 375/219, 260, 262, 375/267, 295, 316; 714/794–795
See application file for complete search history.

(56) References Cited

U.S. PATENT DOCUMENTS

| | | | |
|---|---|---|---|
| 2009/0103648 A1* | 4/2009 | Fukuoka | H04L 5/0044 375/267 |
| 2017/0171012 A1* | 6/2017 | Darwish | H03C 5/00 |
| 2019/0036746 A1* | 1/2019 | Hwang | H04L 27/3444 |
| 2021/0234582 A1* | 7/2021 | Murakami | H04B 7/0465 |

OTHER PUBLICATIONS

Bergmans et al., "Cooperative broadcasting," *IEEE Transactions on Information Theory*, vol. 20, No. 3, pp. 317-324 (May 1974).
Cui, "Exploiting Two-user Superimposed Signals for Wireless Communication Systems," available from https://dspace.library.uvic.ca/bitstream/handle/1828/12511/Cui_Wen_PhD_2020.pdf, pp. 1-148 (Dec. 2020).
Cui et al., "PhyCode: A practical wireless communication system exploiting superimposed signals," *ICC 2019-2019 IEEE International Conference on Communications*, 6 pages (May 2019).

(Continued)

*Primary Examiner* — Shawkat M Ali
(74) *Attorney, Agent, or Firm* — Klarquist Sparkman, LLP

(57) ABSTRACT

Methods and systems are disclosed for sharing a communication resource. Two transmitters seek to use the same two communication slots to transmit two symbols each to a receiver. At each transmitter, data rotation provides two orthogonal combinations of two input symbols which are transmitted in the two slots. An additional phase rotation between slots at one of the transmitters provides phase diversity. The receiver receives superimposed signals from the transmitters, each slot providing information of all four symbols. Joint detection over the two slots provides coding gain and reliable recovery of all four symbols in the two communication slots. Performance results are provided. Disclosed techniques are lightweight and suitable for resource-constrained IoT devices.

20 Claims, 16 Drawing Sheets

(56) References Cited

OTHER PUBLICATIONS

Cui et al., "SigMix: Decoding superimposed signals for IoT," *IEEE Internet of Things Journal*, vol. 7, No. 4, pp. 3026-3040 (Jan. 2020).
Ghanavati et al., "Tight bound on the error probability of rotation code in rayleigh fading channels," *2014 IEEE 80th Vehicular Technology Conference*, 5 pages (Sep. 2014).
Gollakota et al., "ZigZag decoding: Combating hidden terminals in wireless networks," available from https://dspace.mit.edu/bitstream/handle/1721.1/44376/276947787-MIT.pdf, pp. 1-62 (Jun. 2008).
Islam et al., "Nonorthogonal multiple access (NOMA): How it meets 5G and beyond," arXiv:1907.10001, 38 pages (Jul. 2019).
Liu et al., "Non-orthogonal multiple access for 5G and beyond," *Proceedings of the IEEE*, vol. 105, No. 12, pp. 2347-2381 (Dec. 2017).
Lu et al., "Network-coded multiple access," *IEEE Transactions on Mobile Computing*, vol. 13, No. 12, pp. 2853-2869 (Apr. 2014).
Pan et al., "Practical power-balanced non-orthogonal multiple access," *IEEE Journal on Selected Areas in Communications*, vol. 35, No. 10, pp. 2312-2327 (Jul. 2017).
Tse et al., "Fundamentals of Wireless Communication," Draft, available from: https://web.stanford.edu/~dntse/papers/main.pdf, pp. 1-645, incl. §3.2.2 and Exercises (Aug. 2004).
Van Der Meulen, "Three-terminal communication channels," *Advances in Applied Probability*, vol. 3, No. 1, pp. 120-154 (Apr. 1971).
Xiong et al., "An open source SDR-based NOMA system for 5G networks," *IEEE Wireless Communications*, vol. 22, No. 6, pp. 24-32 (Dec. 2015).
You et al., "Network-coded multiple access II: Toward real-time operation with improved performance," *IEEE Journal on Selected Areas in Communications*, vol. 33, No. 2, pp. 264-280 (Dec. 2014).
You et al., "Reliable physical-layer network coding supporting real applications," *IEEE Transactions on Mobile Computing*, vol. 16, No. 8, pp. 2334-2350 (Oct. 2016).

\* cited by examiner

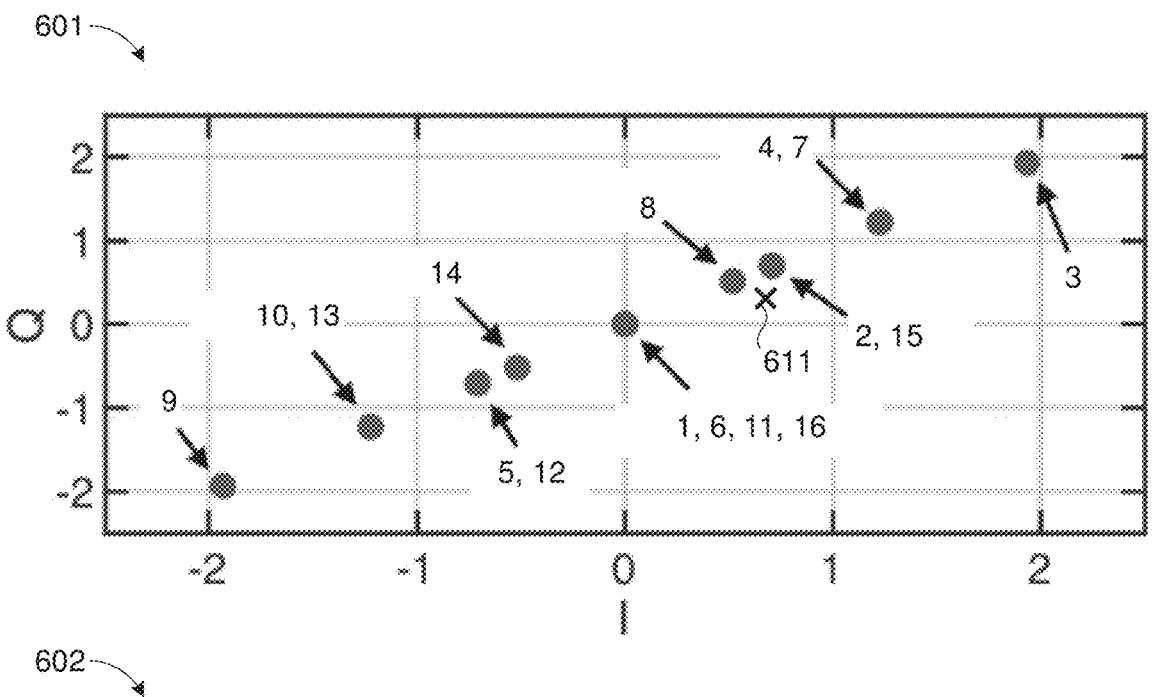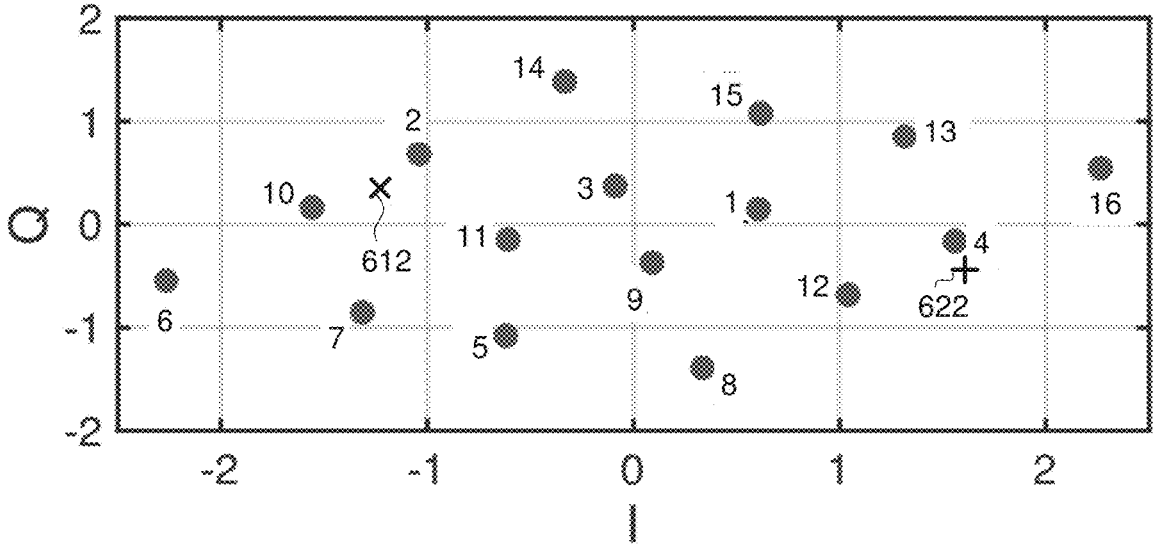
FIG. 6

1100

1110 IN A FIRST SLOT, RECEIVE A FIRST SUPERPOSITION U1 OF SIGNALS S1, S2 FROM RESPECTIVE TRANSMITTERS,

WITH S1 ENCODING COMBINATION D1 OF SYMBOLS D1A, D1B

1120 IN A SECOND SLOT, RECEIVE A SECOND SUPERPOSITION U2 OF SIGNALS S3, S4 FROM THE TRANSMITTERS,

WITH S3 ENCODING COMBINATION D3 OF SYMBOLS D1A, D1B,

WITH S3 HAVING A FIRST PHASE ROTATION RELATIVE TO S1,

AND S4 HAVING A SECOND PHASE ROTATION RELATIVE TO S2

1130 EXTRACT DATA RESPECTIVELY ENCODED IN S1, S2 FROM U1 OR FROM U2,

WITH THE EXTRACTED DATA INCLUDING SYMBOLS D1A, D1B

*FIG. 11*

EFFICIENT RELIABLE COMMUNICATION WITH SUPERIMPOSED TRANSMISSIONS

BACKGROUND

Demand for wireless bandwidth continues to grow rapidly, driven in part by steadily increasing numbers of Internet-of-Things (IoT) devices. A billion or more IoT devices are expected to be put in service each year for the foreseeable future. Predominantly, such devices communicate with hosts and with each other over short-range wireless links. However, available wireless bandwidth remains a finite resource, with new bandwidth only infrequently becoming available for general use.

Meanwhile, wireless technologies also show progress, and numerous schemes have been proposed to improve bandwidth utilization. Some approaches utilize complex modulation schemes, requiring high signal-to-noise ratio (SNR) and high transmit power, which can also increase the range over which devices interfere with one another. Other approaches use sophisticated error correction to operate at reduced power levels, but require intensive computation for error correction. Additional approaches can discriminate signals having a difference in power levels, but require devices to implement transmit power control. A common feature of these and other conventional approaches is that they can be unsuitable for low-cost IoT devices having limited hardware resources.

Accordingly, there remains a need for improved technologies for wireless communication suitable for IoT devices, providing high spectrum efficiency without burdensome hardware requirements.

SUMMARY

In brief, the disclosed technologies use rotation codes to enable superimposed signals from two transmitters to be distinguished and detected. The pair of transmitters can be allocated two communication slots, with each transmitter transmitting in both the slots, so that a receiver sees superimposed transmissions. By changing relative phase of the transmitters between the two slots, both transmitters' data can be detected during at least one of the slots. Additional spectral efficiency can be obtained by doubling the symbol rate, so that one slot carries two symbols from each transmitter. To illustrate, four symbols (two from each transmitter) can be recovered in two symbol periods (each slot being one symbol period), for a spectral efficiency of 4/2=2. Still further, the disclosed technologies can provide coding gain relative to a reference configuration in which each transmitter is allocated one of the slots and transmits two symbols in that slot.

In certain examples, the disclosed technologies can be implemented as a method. A data rotation is applied to two input symbols to generate distinct first and second output symbols. In a first communication slot, a first signal is transmitted from a first transmitter and a second signal is transmitted from a second transmitter, with the first signal encoding the first output symbol. A third signal is generated, which encodes the second output symbol and additionally has a first phase rotation relative to the first signal. A fourth signal is generated, which has a second phase rotation relative to the second signal. The difference between the first phase rotation and the second phase rotation is in a range 70° to 140°. In a second communication slot, the third signal is transmitted from the first transmitter and the fourth signal is transmitted from the second transmitter.

In some examples, the second phase rotation can be 0°. The fourth signal can be identical to the second signal. The first communication slot and the second communication slot can be distinguished by one or more of: frequency bin, time interval, or spreading code. The first signal and the second signal in the first communication slot can be indistinguishable based on frequency separation, time separation, or spreading code separation. Each input symbol can have N possible values and each of output symbols can have $N^2$ possible values.

In further examples, the data rotation can be a first data rotation and the method can include applying a second data rotation to generate distinct third and fourth output symbols from another two input symbols, with the second and fourth signals respectively encoding the third and fourth output symbols. In additional examples, a protocol for the first and second transmitters can be negotiated before the first and second communication slots. Responsive to the negotiating, the first transmitter can be configured to transmit the first and third signals with the relative first phase rotation. The second transmitter can be configured to transmit the second signal and the fourth signal with the relative second phase rotation. In additional examples, the method can include transmitting, in a preamble interval of the first communication slot before transmission of the first and second signals, a first preamble from the first transmitter and a second preamble from the second transmitter. The first preamble and the second preamble can be distinguishable based on timing or code separation.

In certain examples, the disclosed technologies can be implemented as instructions stored on computer-readable media. Upon execution by one or more hardware processors, the instruction cause the following operations to be performed. A first superposition of a first signal from a first transmitter and a second signal from a second transmitter are received in a first communication slot. A second superposition of a third signal from the first transmitter and a fourth signal from the second transmitter are received in a second communication slot. A first phase rotation between the third signal and the first signal differs from a second phase rotation between the fourth signal and the second signal by a value in a range 80° to 130°. Combined data encoded in the first signal and in the second signal are extracted from the received first superposition or from the received second superposition, wherein the first signal encodes a first combination of two symbols, the third signal encodes a second combination of the two symbols distinct from the first combination, and the extracted combined data includes the two symbols.

In some examples, the operations can also include receiving, in a preamble period of the first communication slot, distinguishable first and second preambles having attributes characteristic of the first signal and the second signal respectively. The first preamble can be detected and analyzed to determine one or more offsets. A detector can be configured to apply the offset(s) for detection of the first signal. Using the offset(s), the first combination of the two symbols can be detected. The first combination can be a first rotation transform of the two symbols, the second combination can be a second rotation transform of the two symbols, and the first rotation transform can be orthogonal to the second rotation transform.

In additional examples, the operations can also include receiving, in a preamble period of the first communication slot, distinguishable first and second preambles having attributes characteristic of the first signal and the second signal respectively. The first and second preambles can be detected, whence first constellation points of the first superposition can be identified for respective first data values of the first signal and respective second data values of the second signal. The extracting can include detecting a first position of the first superposition, relative to the first constellation points, and determining a given constellation point, among the first constellation points, near the first position, whence the two symbols can be identified from the respective first data value of the given constellation point.

In other examples, the operations can also include receiving, in a preamble period of the first communication slot, distinguishable first and second preambles having attributes characteristic of the first signal and the second signal respectively. The first and second preambles can be detected, whence first constellation points of the first communication slot can be identified for respective data values of the first signal and respective data values of the second signal. Second constellation points of the second communication slot can also be identified. The extracting can include detecting a first position of the first superposition, relative to the first constellation points, and detecting a second position of the second superposition, relative to the second constellation points. The combined data encoded in the first signal and in the second signal can be estimated based jointly on the first position, the first constellation points, the second position, and the second constellation points. The combined data can be selected from among a plurality of possible values, each possible value of the combined data having respective points among the first and second constellation points at respective first and second distances from the first and second positions on respective constellation diagrams. Among the possible values of the combined data, the estimated combined data can minimize a sum of the first and second distances.

In certain examples, the disclosed technologies can be implemented as a system incorporating three communication devices, namely a first transmitter, a second transmitter, and a receiver. Each of the communication devices can include one or more hardware processors with memory coupled thereto, one or more antennas coupled to the one or more hardware processors, and computer-readable media storing instructions executable by the one or more hardware processors. The first transmitter is configured to apply a first data rotation to generate distinct first and second output symbols from two first input symbols, to encode the first output symbol as a first signal, to encode the second output symbols as a third signal additionally having a first phase rotation relative to the first signal, and to transmit the first and third signals in first and second communication slots respectively. The second transmitter is configured to apply a second data rotation to generate distinct third and fourth output symbols from two second input symbols, to encode the third output symbol as a second signal, to encode the fourth output symbol as a fourth signal additionally having a second phase rotation relative to the second signal, and to transmit the second and fourth signals in the first communication slot and in the second communication slot respectively. A difference between the first phase rotation and the second phase rotation is in a range 60° to 150°. The receiver is configured to receive a first superposition of the first and second signals in the first communication slot and to receive a second superposition of the third and fourth signals in the second communication slot, and to detect the two first input symbols and the two second input symbols from the first superposition and the second superposition.

In some examples, the system can provide coding gain over a comparative configuration in which the first communication slot carries the first signal with the second transmitter idle and the second communication slot carries the second signal with the first transmitter idle.

In additional examples, the first and second transmitters can be telephones and the receiver can be an access point. In other examples, the first and second transmitters can be IoT sensors. In further examples, the three communication devices can be mounted upon respective vehicles.

The foregoing and other objects, features, and advantages of the invention will become more apparent from the following detailed description, which proceeds with reference to the accompanying figures.

BRIEF DESCRIPTION OF THE DRAWINGS

FIG. 6 depicts constellation diagrams according to an example of the disclosed technologies.

FIG. 11 is a flowchart of a second example method according to the disclosed technologies.

DETAILED DESCRIPTION

Overview

Figure 1:
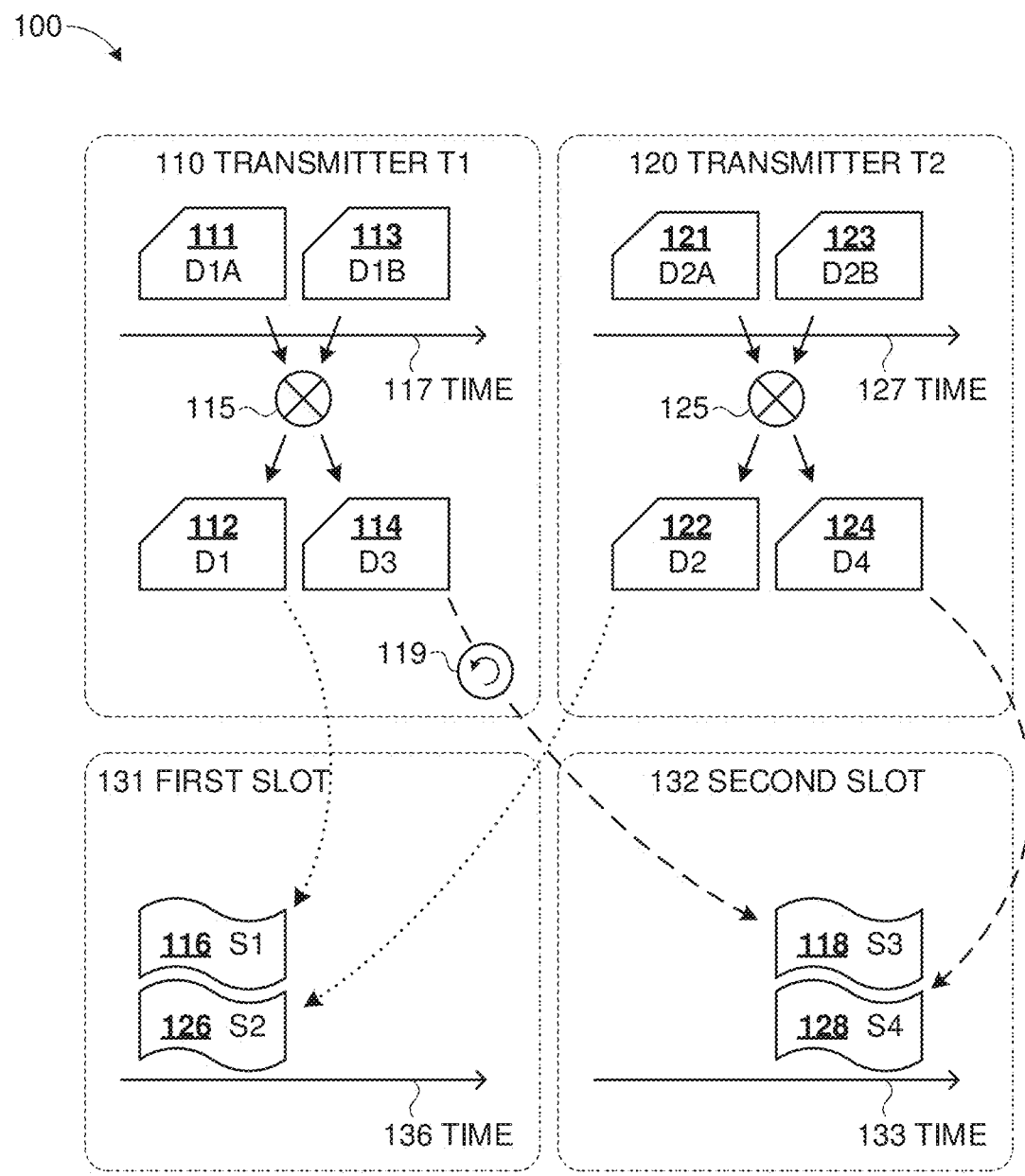
FIG. 1 is a dataflow diagram illustrating an example of the disclosed technologies.

As wireless IoT devices proliferate, there is a great need for lightweight techniques for spectrally efficient sharing of wireless communication resource. The disclosed technologies allow two transmitters to share two communication slots and, through diversity and coding gain, offer better performance than each the transmitter using just one of the communication slots.

In examples, each transmitter can use data rotation to derive two orthogonal combinations of two input symbols, and can transmit each of the combinations in a respective slot. At least one of the transmitters can apply an additional phase rotation between the two slots to obtain phase diversity. At a receiver, superpositions of the two transmitters' signals are received, providing information of all four input symbols (two from each transmitter) in each of the two slots. Joint detection over the two slots provides coding gain and reliable recovery of all four input symbols. In a variation, where one of the slots exhibits a poor phase relationship between the two transmitters' signals, that slot can be ignored and the other slot can be used by itself for detecting all four symbols.

The disclosed technologies can provide benefit to IoT applications in many fields, including smart home, smart building, smart roads, retail, machine-to-machine communication, collision avoidance, self-driving automobiles, sensor networks, and other applications. While examples of the disclosed technologies are described in the context of local wireless communications, using WiFi or WiFi-like technologies, the technologies are not so limited. The disclosed technologies can be widely applied to any shared medium communication, including wired communication, optical communication, acoustic communication, or long-range wireless electromagnetic communication.

The examples and discussion below provide additional detail and explanation.

Terminology

The usage and meaning of all quoted terms in this section applies throughout this disclosure unless clearly indicated otherwise or repugnant to the context. The terminology below extends to related word forms.

An "access point" is a communication device forming a bridge between a local network and a wide area network, such as an internet or telephony network. Examples of access points include wireless routers, base stations, internet points-of-presence (PoP), smart home controllers, or other network controllers. Some smartphones can serve as access points. Some IoT devices can be homed to access points.

A "communication channel" is a temporally recurring sequence of communication slots. The slots can be homogeneous, i.e. having same frequency, same spreading codeword (if any), and other attributes, but this is not a requirement. For example, a communication channel can hop among frequencies. "Channel estimation" refers to determining transmission properties of a communication channel or a communication slot, for example properties such as attenuation, phase shift, or noise level.

A "communication slot" is a finite allocation of a communication medium, and can be characterized by one or more attributes such as frequency bin, time interval, or spread spectrum codeword. Generally, two distinct communications within a same communication slot can be indistinguishable by simple filtering based on time, frequency, or codeword, but can sometimes be distinguished using more sophisticated techniques as described herein. Depending on the communication medium and coherence between transmitter and receiver, other attributes can be used to define a communication slot. In some systems, polarization or phase can be used to distinguish two communication slots. However, in example scenarios described herein (such as indoor WiFi, or between vehicles) it can be challenging to maintain a predictable phase or polarization between transmitter and receiver, and a communication slot can experience uncontrolled variation of possible phase or polarization. Nevertheless, a controlled change in phase can advantageously be used to resolve superimposed signals in a communication slot, as described herein.

A "constellation" is a set of points for respective values of a communication symbol. Each constellation point indicates N idealized received signal levels in an N-dimensional space for the corresponding value of the communication symbol. A two-dimensional constellation space is used in some disclosed examples, representing in-phase (I) and quadrature (Q) signal levels. However, this is not a requirement, and other dimensionalities can also be used: a one-dimensional constellation can be used for amplitude modulation or frequency modulation; a three-dimensional constellation can be used in optical communication; or higher dimensional constellations can be used for trellis coding. The constellation points can be represented on a diagram dubbed a "constellation diagram". Actual received signal levels can be referenced to the axes of the constellation diagram to define a point (sometimes dubbed a "position") in the constellation space.

The unqualified term "data" refers to baseband information of a communication. Generally, data at a transmitter is encoded as a signal and transmitted while, at a receiver, a signal is received and decoded to recover data.

"Decoding" refers to all or part of a process of recovering baseband data from one or more on-air signals. Decoding can include demodulation or downconversion to transform a signal from a transmission frequency (RF) to an intermediate frequency (IF) or a baseband representation of data. Decoding can include various forms of baseband decoding, such as differential encoding, forward error correction decoding, or decryption. Decoding can include filtering, amplification, and similar analog or digital functions. Particularly, decoding can include matching one or more measured points against respective constellation diagram(s).

The term "detect" refers to extraction of information from a signal. Detection can be used to extract digital samples from a signal, to perform channel estimation, or to extract data symbols from a signal.

"Encoding" refers to all or part of a process of converting baseband data to one or more on-air signals. Encoding can include various forms of baseband encoding, such as data rotation, differential encoding, forward error correction encoding, or encryption. Encoding can include phase rotation, modulation, or upconversion to transform a baseband representation of data to an intermediate frequency (dubbed "IF") or transmission frequency (dubbed "RF" which can include a radio frequency, from 20 kHz-300 GHz, but is not so limited). Encoding can include filtering, amplification, and similar analog or digital functions. Particularly, encoding can include applying one or more rotation codes in some disclosed examples.

An "Internet of Things" (IoT) refers to a network of devices connected via an internetworking protocol, and can include devices having physical world functionality beyond that of a general purpose computer. While an IoT can include or connect to the public Internet, this is not a requirement, and an IoT can be isolated at a site with no connectivity to the public Internet. In further examples, an IoT can be connected as a virtual private network (VPN) over another network such as the public Internet or a telephony network. Some "IoT devices" can have device specific annunciators or user keys, without any general purpose display or keypad. Other IoT devices can lack any annunciators or user controls, or can have a single status indicator, being managed by a remote host terminal over an IoT.

An "IoT sensor" is a device which transmits physical world data from its proximate environment to a host or sink device through an IoT. Examples of IoT sensors include, without limitation, cameras, thermometers, weather instruments, or monitors (sometimes dubbed "senders") in vehicles, office equipment, or other machinery.

An "IoT actuator" is a device performing a physical world action based on instructions from a host or source device through an IoT. Examples of IoT actuators include, without limitation, lights, locks, alarms, valves, or mechanisms or devices performing assorted functions in vehicles, office equipment, or other machinery.

A "medium" is a spatial extent over which communication signals can propagate. Of interest in this disclosure is a "shared medium" in which multiple signals can propagate simultaneously. A common medium for disclosed examples is air, however this is not a requirement, and the disclosed technologies can be applied in environments where all or part of the medium is liquid (e.g. underwater), solid (e.g. conductive wires, or for propagation of acoustic signals), vacuum (e.g. in space), or an inhomogeneous combination thereof. While many common media contain matter, this is not a requirement, and vacuum can also be a medium. The common term "on-air" is used broadly herein to characterize signals propagating in a medium and does not imply that the medium is "air." The terms "wireless transmission resource" (or simply, "wireless resource") refer to the capacity of a medium to transmit communication signals. A wireless resource can be partitioned by frequency bin, time slot, spreading codeword, or other attributes to provide a diversity of communication slots.

Two signals are said to be "orthogonal" if they can be distinguished based on having separated frequency, time interval, or spreading codeword. In some examples, orthogonal signals can be distinguished based on having staggered (offset) time structure.

"Phase" is an attribute of a multi-dimensional quantity which indicates relative contributions of components along different dimensions. Phase can be considered as indicating a direction of the quantity relative to the multiple dimensions, without indicating a magnitude of the quantity. In two dimensions, phase is often represented as a signed angle relative to a reference axis, but this is not a requirement. To illustrate, a two-dimensional signal having an in-phase amplitude of 1 and a quadrature amplitude of −0.2 can be described as having a phase of $\tan^{-1}(-0.2/1)=-11.3°$.

A "preamble" is a data transmission separate from payload of a data communication, and used to determine characteristics of an associated received payload signal. For example, the received signal can be influenced by transmitter offsets (e.g. carrier frequency offset (CAFO), sampling frequency offset (SFO), or sampling time offset (STO)). Characteristics of a transmission medium, such as dispersion, can also affect the received signal. Measurements of the preamble can be used to determine effects of transmitter or medium characteristics, and signal decoding can be adjusted to compensate for these effects. A period of time during which the preamble transmission occurs is dubbed a "preamble interval." The preamble interval commonly precedes the payload signal, but this is not a requirement. In other examples, the preamble interval can be placed in the middle of a payload or can be distributed among a plurality of disjoint sub-intervals. Particularly, a single preamble interval can be shared between orthogonal preambles from two transmitters. A single preamble interval can be used to determine slowly varying transmitter or channel characteristics for two or more payload signals.

A "communication protocol" (or, simply "protocol") is a set of rules for compatible communication between two or more devices. In some disclosed examples, a protocol can be negotiated between two transmitters and informed to a receiver. For example, transmitter T1 can provide a first phase rotation of 117° between a first and second communication slot, while transmitter T2 can provide 0° phase rotation between the first and second communication slots. The protocol can also define the communication channel to be shared by transmitters T1 and T2, whereby other communication channels can be allocated to other devices.

The terms "receive" and "transmit" refer to data communication over a medium, which can be in the form of a signal. The communication can be wireless, but this is not a requirement. Optical, wired, or other forms of electromagnetic communication can also be used. A device placing a signal on the medium is dubbed a "transmitter," while a counterpart device responding to a signal (or, superposition of signals) on the medium is dubbed a "receiver." In some examples, receivers or transmitters can have dedicated roles, while in other examples, receivers and transmitters can swap roles for bidirectional communication. In further examples, receivers or transmitters can also communicate with other devices. In between transmissions, a transmitter or receiver can be "idle." In varying examples, an idle transmitter can have its transmitter disabled; or can transmit an identifier, a timing mark, a beacon, or other non-payload bearing transmission over the medium.

A "rotation" is a change in representation of one or more quantities without loss of information. In some examples, rotation can be implemented using matrix operations, as shown below in Equations (1)-(4). In this disclosure, data rotations and phase rotations are described. A "data rotation" is a rotation which can be applied jointly to two independent input data symbols to obtain two output symbols. Generally, if each input symbol has N possible values, then each output symbol can have up to $N^2$ possible values. Equation (1) illustrates a data rotation. A "phase rotation" is a rotation which can be applied to a single multi-dimensional quantity such as a two-dimensional signal value having I, Q components. Generally, the multi-dimensional quantity has a same number of components before and after phase rotation. Equation (2) illustrates a phase rotation. Inasmuch as a rotation can change the encoding of data, rotations are sometimes described as a rotation code. A data rotation and a phase rotation can be combined, as shown in Equation (3). A rotation can be quantified as a signed angle, e.g. +30° or −115°. Thus, the domain for a rotation can be (−180°, +180°]. In contrast, the difference between two rotations can be quantified as an unsigned angle, which can have a domain [0°, 180°].

A "signal" is a manifestation of a data communication over a communication medium. In some described examples, the communication can be wireless and the medium can be air or a vacuum.

A "spreading code" or "codeword" is used in some spread spectrum communication systems to partition a communication resource. Particularly, two signals modulated with separate orthogonal spreading codes can be readily distinguished using the spreading codes as filters, even if the signals occupy the same time interval and the same frequency bin.

Two or more signals present in a single communication slot form a "superposition." Orthogonal signals which may be present at a same time in the medium are not considered to be a superposition, but can occupy "concurrent" or overlapping communication slots.

A "symbol" is a unit of data in a communication. At baseband, exemplary symbols can include a bit, a byte, a multi-byte word, a packet, or a forward error correction (FEC) codeword. On a wireless or other transmission medium, exemplary symbols can include a bit, an n-bit symbol in an $n^2$-ary encoding scheme (e.g. 2 bits in quaternary amplitude phase keying (4-APK) or quadrature phase shift keying (QPSK) or 8 bits in 256-ary quadrature amplitude modulation (256-QAM)), or a packet. The number of symbols transmitted per unit time in a given data stream is the "symbol rate" of the data stream. For example, legacy telephony and some WiFi embodiments use an 8 kHz symbol rate. Baseband symbols can but need not correspond 1:1 with symbols transmitted or received over the air. For clarity of illustration, some examples herein use transmitter-side symbols of 1 bit at baseband and two bits over the air, and receiver-side symbols of four bits over the air and 1, 2, or 4 bits at baseband, but this is not a requirement and other symbol organization can be used.

A "telephone" is a device used for voice communication. Examples of telephones include smartphones, walkie-talkies, or voice-over-internet-protocol (VoIP) phones.

A "vehicle" is a device for physically transporting people or goods. Examples of vehicles include various classes of passenger vehicles, trucks, buses, trains, bicycles, motorcycles, aircraft, watercraft, hovercraft, or spacecraft. While many vehicles are motorized, this is not a requirement.

Example Dataflow

FIG. 1 is a dataflow diagram 100 illustrating an example of the disclosed technologies. In this example, data is combined twice to provide reliable transmission through diversity and also obtain coding gain. First, data is combined at each transmitter. Then, signals containing the combined data are transmitted in two communication slots. Each transmitter uses both communication slots, so that the on-air signals from the two transmitters are combined by superposition.

Data and operations at transmitter T1 are indicated in the dashed outline 110. Two symbols 111 D1A, 113 D1B of a temporal data sequence are shown along time axis 117. The symbols can be combined in a coding operation 115 to obtain two distinct data combinations 112 D1, 114 D3. Generally, data symbols 111 D1A, 113 D1B can be independent, but can occasionally have the same value. In some examples, the coding operation 115 can be a data rotation according to Equation (3).

$$\begin{bmatrix} D1 \\ D3 \end{bmatrix} = \begin{bmatrix} \cos\theta & -\sin\theta \\ \sin\theta & \cos\theta \end{bmatrix} \begin{bmatrix} D1A \\ D1B \end{bmatrix}; \quad (1)$$

$D1A, D1B \in \{-1, 1\}$ for one-bit symbols

Through trigonometric identities, Equation (1) can be written in alternate form:

$$\begin{bmatrix} D1 \\ D3 \end{bmatrix} = \begin{bmatrix} \cos\theta & -\sin\theta \\ \cos(\theta - 90°) & -\sin(\theta - 90°) \end{bmatrix} \begin{bmatrix} D1A \\ D1B \end{bmatrix} \quad (1a)$$

Equation (1a) demonstrates that the illustrated data rotation 115 applies rotation transformation to D1A, D2A, and that the rotations generating D1, D3 can be orthogonal, being offset by 90°. However, this is not a requirement, and other non-orthogonal rotation combinations can also be used.

In some examples, θ can be chosen to be about 30° for good discrimination between possible values of (D1A, D1B). Because Equation (1) specifies different functions for D1 and for D3, the codings 112 D1, 114 D3 provide diversity.

Transmitter T1 can encode data 112 D1 and transmit signal 116 S1 containing data D1 in a first communication slot 131 as shown. Transmitter T1 can also perform a phase rotation operation 119 to data 114 D3, encode the result and transmit signal 118 S3 containing data D3 in a second communication slot 132 as shown. The phase rotation can be between in-phase and quadrature components of an IF or RF representation of coded data 114 D3. Equation (2) shows an exemplary phase rotation from (complex) D3=D3i+j·D3q to D3'i=D3'q.

$$\begin{bmatrix} D3'i \\ D3'q \end{bmatrix} = \begin{bmatrix} \cos\Delta\gamma & -\sin\Delta\gamma \\ \sin\Delta\gamma & \cos\Delta\gamma \end{bmatrix} \begin{bmatrix} D3i \\ D3q \end{bmatrix} \quad (2)$$

Alternatively, Equation (2) can be expressed in complex notation as D3'=D3·exp (jΔγ). In varying examples, Δγ can be chosen to be about ±117° or about ±90°.

Meanwhile, transmitter T2 can perform similar operations on its data symbols 121 D2A, 123 D2B. Coding operation 125 provides diverse combinations 122 D2, 124 D4 of symbols 121 D2A, 123 D2B. These combinations can be encoded and respectively transmitted as signals 126 S2, 128 S4 in slots 131, 132 as shown. Generally, data symbols 121 D2A, 123 D2B can be independent, but can occasionally have the same value.

During each time slot 131, 132, the transmissions from transmitters T1, T2 can be superimposed on-air and received as a superposition by a receiver (not shown).

Numerous extensions and variations of this dataflow can be implemented. While bit symbols can be described in context of Equation (1), this is not a requirement, and similar operations can be performed with more complex symbols. For coding according to Equation (1), values of θ that are certain multiples of 30° or close to such multiples can offer similar performance. Accordingly, θ can be chosen to be in a range [(3·N+1)·30°−a, (3·N+1)·30°+a] or [(3·N−1)·30°−a, (3·N−1)·30°+a] for integer N and a=1°, 2°, 5°, 10°, or 20°. Other coding can be used alternatively or in addition to the data rotation matrix of Equation (1). For example, multi-level amplitude modulation, staggered symbol boundaries, or differential coding can be used.

For simplicity of illustration, phase rotation 119 is shown applied only to combined data 114 D3. However, in other examples, phase rotation can also be applied to 124 D4, or to any combination of 112 D1, 114 D3, 122 D2, 124 D4. If respective phase rotations γ1-γ4 are applied to data D1-D4, it can be desirable to have |−γ1+γ2+γ3−γ4| in a range [90°−b, 90°+b] or [117°−b, 117°+b] for b=1°, 2°, 5°, 10°, or 20°. That is, γ3−γ1 can be a relative phase rotation at the first transmitter T1 between the transmissions in the first and second communication slots. Similarly, γ4-γ2 can be a phase rotation applied at the first transmitter T1 between the transmissions in the first and second communication slots.

Principles of Operation

1. Orthogonal Communication Slots

Figure 2:
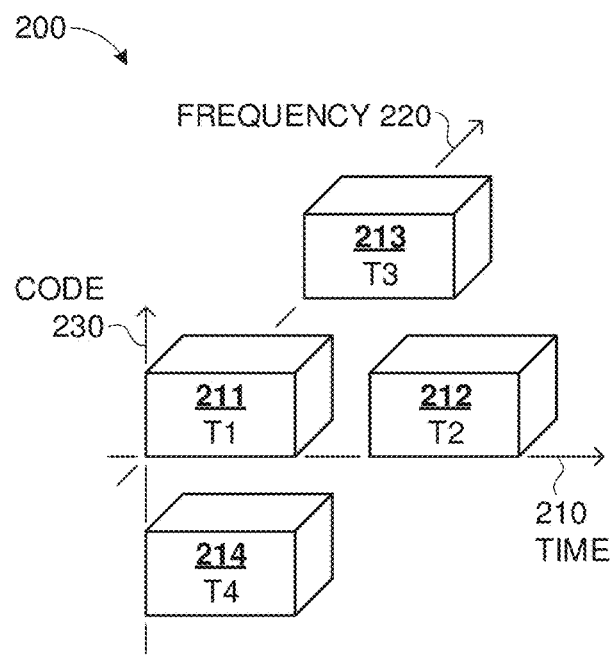
FIG. 2 is a diagram illustrating division of a wireless resource into communication slots.

FIG. 2 is a diagram 200 illustrating division of a wireless resource into communication slots. Communication slots 211-214 are depicted organized in a multidimensional space of time, frequency, and (optional) spreading code. Slots 211-214 are distinguishable based on at least one of time, frequency, or spreading code, and can be considered orthogonal.

Signals in slots 211, 212 occupy different time intervals along time axis 210. Slots 211, 212 can be allotted to distinct transmitters T1, T2 as indicated, to provide time-division multiplexing between transmitters T1, T2, and time-division multiple access (TDMA) to the wireless resource. Signals in slots 211, 213 occupy different frequency bins along frequency axis 220. Slots 211, 213 can be allotted to distinct transmitters T1, T3 as indicated to provide frequency-division multiplexing between transmitters T1, T3, and frequency-division multiple access (FDMA) to the wireless resource.

In some environments, spreading codes can be used. Signals in slots 211, 214 occupy different positions along code axis 230 indicating different spreading codes. Slots 211, 214 can be allotted to distinct transmitters T1, T4 as indicated to provide code-division multiplexing between transmitters T1, T4, and code-division multiple access (CDMA) to the wireless resource.

2. Reuse of Communication Slots

Figure 3:
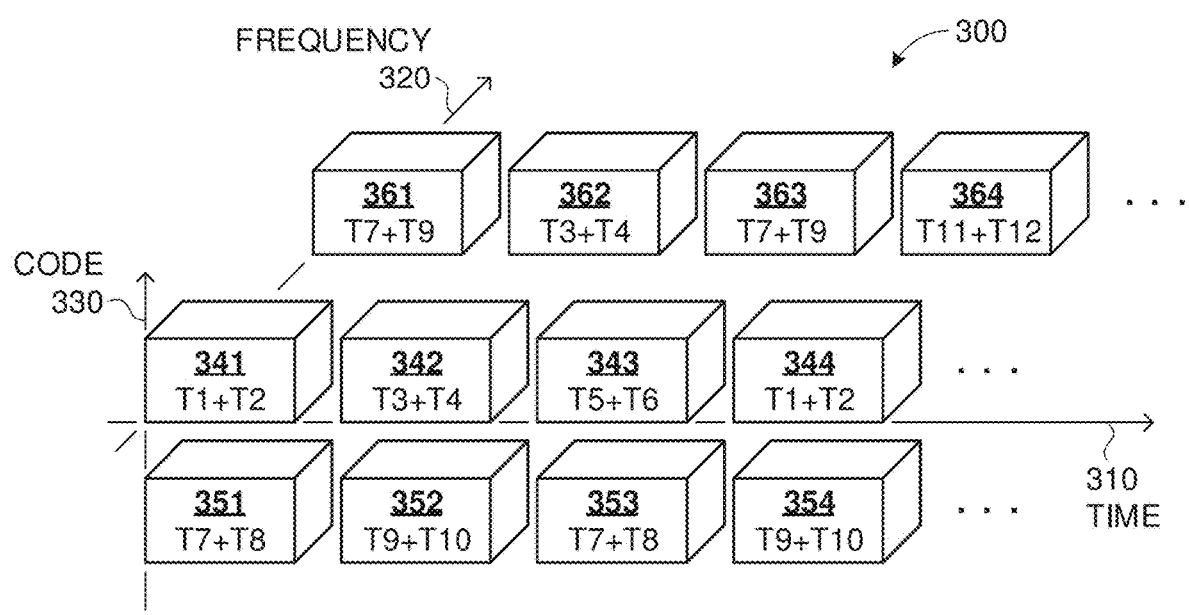
FIG. 3 is a diagram illustrating reuse of communication slots according to examples of the disclosed technologies.

FIG. 3 is a diagram 300 illustrating reuse of communication slots, in various configurations. Communication slots 341-344, 351-354, 361-364 are depicted in a multi-dimensional space organized by time axis 310, frequency axis 320, and code axis 330.

With technologies described herein, two transmitters can share a single communication slot. As shown, transmitters T1, T2 share time slot 341. Neighboring slots 342, 351, 361 can be assigned to other transmitters. As shown, slot 342 is shared between transmitters T3, T4; slot 351 is shared between transmitters T7, T8; and slot 361 is shared between transmitters T7, T9.

Communication slots 341-344 form a temporal sequence of slots at a given frequency bin and, optionally, a given spreading codeword. Because transmitters T1, T2 can require continuing access to a wireless medium, after slot 343 is used by transmitters T5, T6, slot 344 can revert to transmitters T1, T2. Thus, transmitters T1, T2 can be allocated slots at every third temporal interval for a given frequency bin and (optionally) codeword. That is, the first, fourth, seventh, tenth time intervals can form a shared communication channel for transmitters T1, T2.

At the same frequency, but with a different spreading codeword, alternating communication slots 351-354 can be assigned to transmitters T7, T8, and to transmitters T9, T10 as shown.

The communication slots allocated to a given transmitter need not utilize a common frequency bin or a common spreading codeword. Further, a given transmitter can share different slots with different partners. Turning to slots 361-364, which occupy a different frequency bin than slots 341-344 or 351-354, slots 361, 363 are assigned to transmitters, T7, T9. That is, transmitter T9 can share slots 352, 354 with transmitter T10, and can share slots 361, 363 with transmitter T7. Further, the temporal sequence of slots 361, 352, 363, 354 assigned to transmitter T9 can hop between frequency bins or codewords as shown. In another configuration, transmitter T7 can have multiple slots at a given time interval, at different frequency bins or codewords. Slots 342, 362 illustrate a given pair of transmitters T3, T4 having two communication slots 342, 362 at a same time interval.

3. Signal Superposition

Figure 4A:
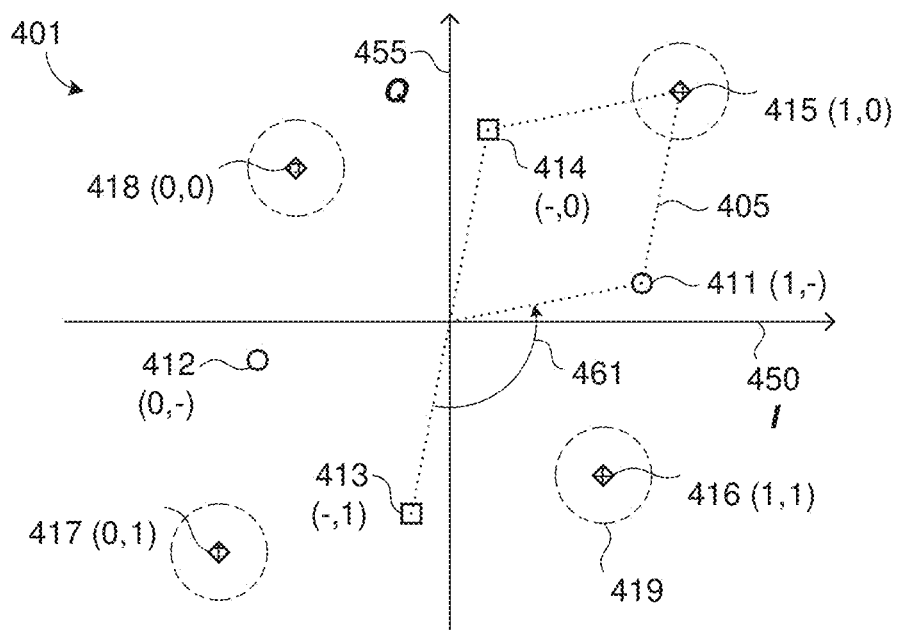
FIGS. 4A-4B are constellation diagrams illustrating superposition of two signals.
Figure 4B:
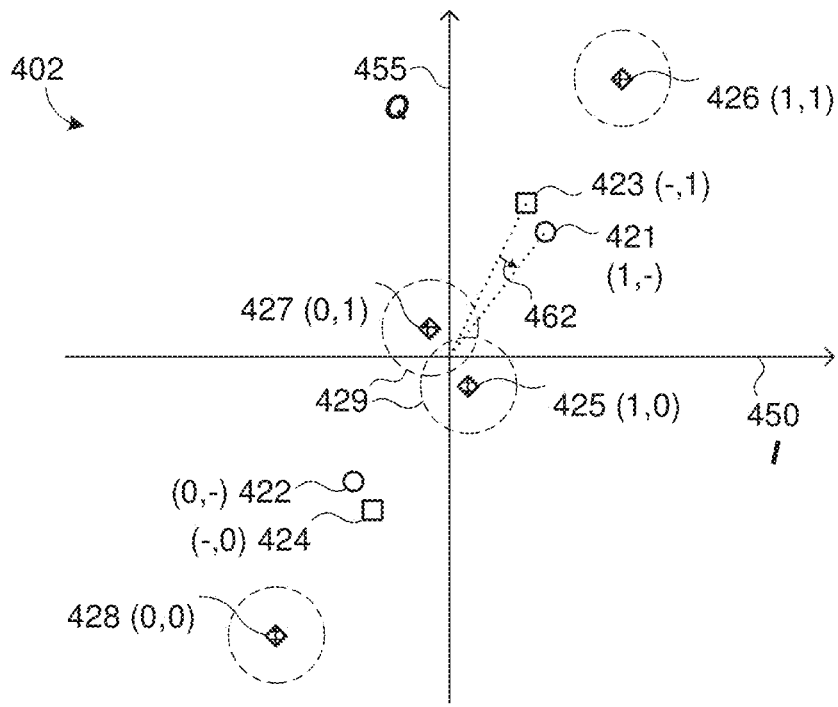

FIGS. 4A-4B are constellation diagrams 401, 402 illustrating superposition of two signals. For clarity of illustration, BPSK signals are illustrated, whose values 0, 1 have phases 180° apart. Signals are represented as their in-phase (I) and quadrature (Q) values along in-phase axis 450 and quadrature axis 455 respectively.

FIG. 4A shows points 411-424 for the individual values of each signal. Points 411, 412 correspond to binary 1 and 0 values of a first signal. Annotations "(1,-)" and "(0,-)" are shown for convenience, with "-" being a placeholder for a value of a second signal. Similarly, points 413, 414 correspond to binary 1 and 0 values of a second signal, as indicated by annotations "(-,1)" and "(-,0)". The constellation points for the superposed signals can be determined by vector or complex number arithmetic. For example, point 415 is the superposition of points 411, 414 as shown by dotted parallelogram 405, and corresponds to first and second signals having respective values of 1 and 0, as indicated by annotation (1,0). Similarly, other constellation points 416-418 correspond to data values (1,1), (0,1), (0,0) as shown. Dashed circles 419 represent noise levels of the system. That is, when the signal values are (1,1), a given percentage (e.g. 50, 80, 95, or 98) of measurements lie within circle 419. As seen in FIG. 4A, the separation between constellation points 415-418 is much greater than a diameter of noise contour 419, and a low bit error rate can be expected. Arrow 461 indicates a phase shift from a point 413 indicating a value of the second signal to the corresponding point 411 of the first signal. Seen at a receiver, phase shift 462 can be denoted $\gamma$.

FIG. 4B shows a variation of FIG. 4A, where the points 421, 422 for the first signal values are in close proximity to the points 423, 424 for the second signal values. The constellation points 425-428 for the superposed signals can be determined in a similar manner as in FIG. 4A. Each constellation point 425-428 has an associated noise contour 429. As seen in FIG. 4B, the separation between constellation points 425, 427 is smaller than the diameter of the associated noise contours 429, and these noise contours 429 overlap. In such case, a high bit error rate can be expected. Arrow 462 indicates a phase shift from a point 423 indicating a value of the second signal to the corresponding point 421 of the first signal. Seen at a receiver, phase shift 462 can be denoted $\gamma$.

A given configuration of transmitters (and a common receiver detecting the superposed signals) can exhibit uncontrolled variation over time, having periods when the constellation points are well separated as in FIG. 4A, and other periods when the constellation points are insufficiently separated, as in FIG. 4B. Such variations can arise through effects such as carrier frequency offset, intermediate frequency variations, inhomogeneous variations in channel conditions, or other variations. Advantageously, controlled phase rotations can be implemented as described herein to attain well separated relative phasing between signals from different transmitters and, consequently, well separated constellation points.

4. Phase Dependence

Figure 5:
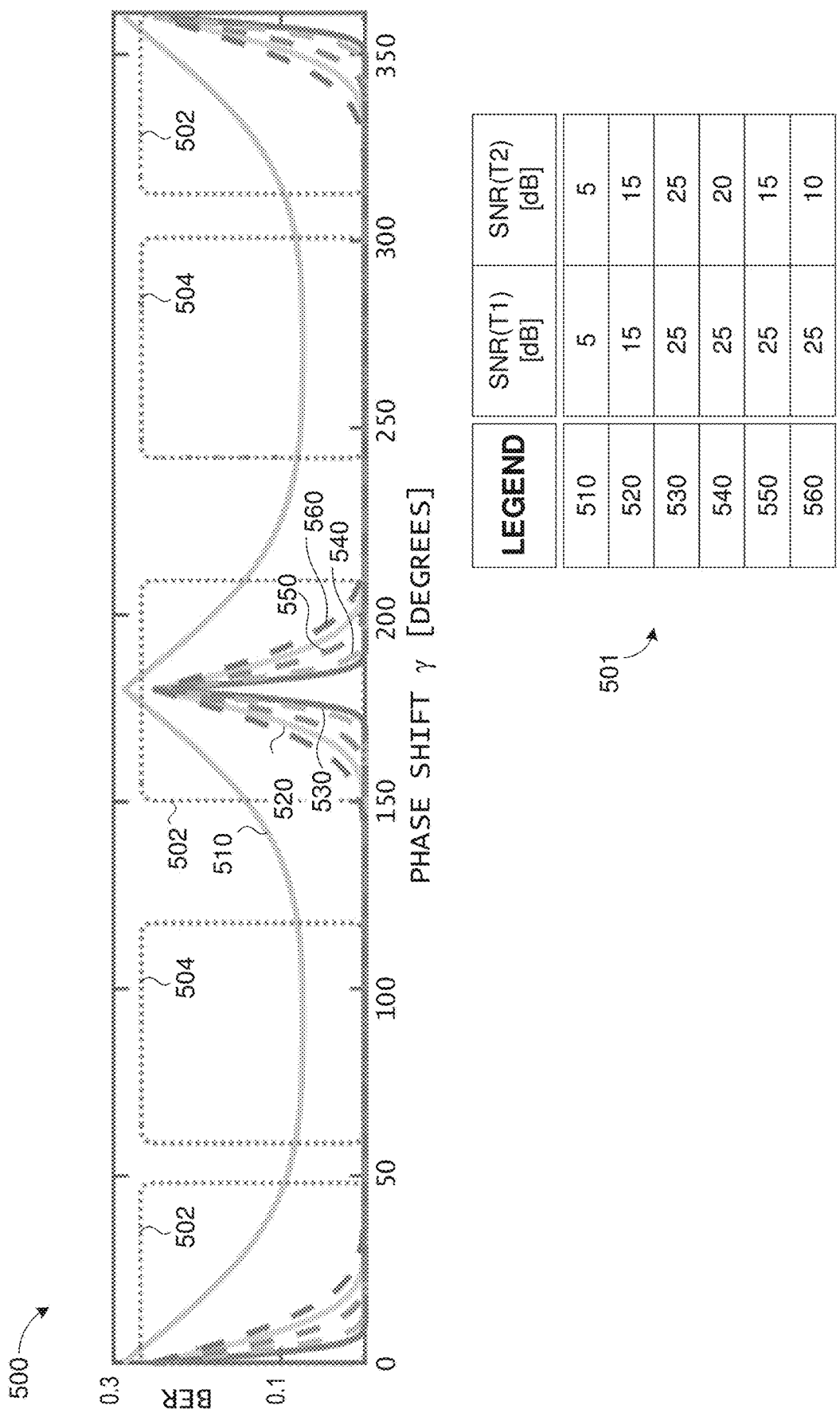
FIG. 5 is a chart illustrating performance of exemplary operating configurations for which the disclosed technologies can be implemented.

FIG. 5 is a chart 500 illustrating performance of exemplary operating configurations for which the disclosed technologies can be implemented. Bit error rate (BER) is plotted on the Y-axis as a function of phase shift $\gamma$ (see, 461, 462 of FIGS. 4A, 4B) between two transmitters. Chart 500 contains graphs 510-560 for respective operating conditions as shown in legend 501. Graphs 510-530 are for cases with equal power received from each of transmitters T1, T2. Graph 510 depicts a case where each transmitter is operating with SNR of 5 dB. Under these conditions, the BER is fairly high regardless of relative phase γ. However, for SNR of 15 dB and up, graphs 520-530 demonstrate suppression of BER away from γ=0° and γ=180°. Graphs 540-560 are for cases where the transmitters have imbalanced power. These graphs show that as long as the weaker transmitter T2 has an SNR of 10 dB or greater, BER can be suppressed away from γ=0° and γ=180°.

Zones 502 are marked where the transmitter phases are nearly aligned or opposed, and high BER can be expected. Zones 504 are marked where good suppression of BER can be obtained for a wide range of operating conditions.

5. Four Bit Constellations

FIGS. 4A-4B, described above, illustrated constellations for single bit symbols, with 1 and 0 being represented as 0° and 180° phases or, equivalently, amplitudes +1, −1. However, for 2:1 bit coding as shown in Equation (1), data D1 or D3 can take four possible values. For θ=30°, these values are approximately −1.37, −0.37, 0.37, 1.37, and consequently two superposed signals can have 16 constellation points.

FIG. 6 depicts constellation diagrams 601, 602 showing the 16 constellation points for two different relative phases of two transmitters. For simplicity of illustration, both transmitters' signals are received with approximately the same power, however, as seen from FIG. 5, this is not a requirement. The constellation points are numbered 1-16, which correspond to the underlying data values D1A, D1B of signal S1 from transmitter T1 and data values D2A, D2B of signal S2 from transmitter T2 as shown in legend 603. Diagram 601 illustrates a case where the received signal phases are nearly aligned and consequently many constellation points are overlapped and may be indistinguishable. Diagram 602 illustrates a case where the received signal phases are well separated and the constellation points are also well separated.

As described herein, relative phase can change spontaneously over time. However, in many environments, spontaneous changes occur slowly relative to a symbol time or to a packet time. Accordingly, a phase rotation can be applied to one transmitter's signal to change the relative phase. Referring back to FIG. 1, phase rotation 119 can be applied to signal 118 S3. Thus, if signals 116 S1 and 126 S2 are received with relative phase in a high-BER zone 502 as shown in FIG. 5, then the phase rotation 119 can adjust the relative phase of signals 118 S3 and 128 S4 to be in low-BER zone 504. In varying examples, slots 131, 132 can be in adjacent time intervals, the same time interval, overlapping time intervals, or nearby time intervals. Accordingly, contributions of transmitter or medium variations can be small or insignificant compared to the phase rotation 119.

Because each of S1-S4 encode two symbols of baseband data (e.g. D1A and D1B, or D2A and D2B), all four baseband data symbols can be recovered from only one slot (e.g. slot 131 or 132) in a low-BER zone 504. In a converse case, where the phase rotation 119 puts slot 132 into a high-BER zone 502, the first slot 131 can be in a low-BER zone 504 and time slot 132 can be ignored.

6. Joint Data Extraction

Also shown in FIG. 6 are I, Q measurement points 611, 612. For purpose of illustration, diagram 601 can be considered as a constellation diagram for slot 131 of FIG. 1, and diagram 602 can be considered as a constellation diagram for slot 132. Measurement point 611 can be the measured in-phase I and quadrature Q amplitudes of superimposed signals 116 S1, 126 S2 in slot 131. Likewise, measurement point 612 can be the measured I, Q values of superimposed signals 118 S3, 128 S4 in slot 132.

In this illustration, measurement point 611 is proximate to constellation points 2, 8, and 15, leaving uncertainty as to the correct symbols to decode. Likewise, measurement point 612 is proximate to constellation points 2 and 10. However, considering diagrams 601-602 jointly, constellation point 2 can be identified as the correct symbols with high confidence. That is, the sum of distances (i) from 611 to constellation point 10 in diagram 601 and (ii) from 612 to constellation point 10 in diagram 602, is significantly less than the corresponding sum of distances for any other constellation point. In this illustration, data symbols $\langle 0\ 0\ 0\ 1\rangle$ for constellation point 10 can be accurately detected from slots 131, 132 jointly, even when accurate detection from a single slot is difficult, demonstrating diversity gain of the disclosed technologies.

In another scenario, measurement point 622 could be identified as constellation point 4 directly from a measurement in slot 132, without recourse to a measurement for slot 131.

7. Amount of Phase Rotation

Figure 7:
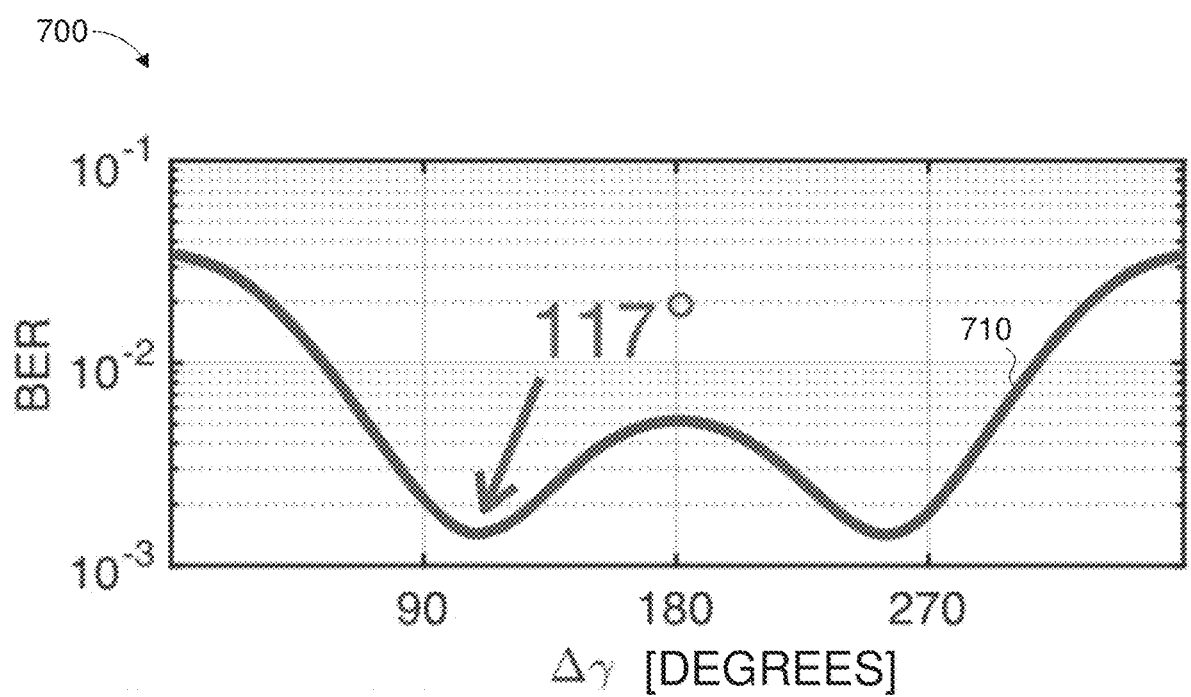
FIG. 7 is a chart depicting the dependence of bit error rate (BER) on phase rotation, according to the disclosed technologies.

FIG. 7 is a chart 700 on which graph 710 depicts the dependence of BER on phase rotation, as determined by simulation. The phase rotation is denoted Δγ in Equation (2), and can be applied by an operation or block such as 119 of FIG. 1. Unsurprisingly, Δγ=0° has a high BER: if communication slot 131 is in a high-BER zone, slot 132 is also likely to be in a high-BER zone. Δγ=180° also has a relatively high BER, but significantly lower than Δγ=0°. This arises due to the asymmetry between the rows of the rotation matrix of Equation (1). As a result, different pairs of constellation points can be degenerate in slots 131, 132. To illustrate with reference to constellation diagram 601 of FIG. 6, a measurement 611 on a superposed signal in communication slot 131 can be proximate to the points labeled 2, 15, and 8. That is, the data symbols can be indeterminate between $\langle 0\ 0\ 0\ 1\rangle$, $\langle 1\ 1\ 1\ 0\rangle$, and $\langle 0\ 1\ 1\ 1\rangle$. However, after a phase rotation of Δγ=180°, constellation point 15 can be degenerate with point 9 instead of point 2 or 8. Thus, if the measurement in slot 132 is proximate to points 15, 9 (this case not shown in FIG. 6), then the combination of measurements of slots 131, 132 can determine that data vector as $\langle 1\ 1\ 1\ 0\rangle$ (point 15) with a high probability, as the only constellation point satisfying measurements of both slots, even though both time slots 131, 132 can individually be in a high-BER zone 504.

Because of the asymmetry, the optimum can be skewed away from 90° toward 180°. Under the modeled conditions, an optimum phase rotation can be found to be ±117° as shown. The optimum phase rotation can vary depending e.g. on relative power of the two signals e.g. the precise coding and communication slot configurations used. For simplicity, phase rotations of ±90° can be used in some examples.

Example Operating Space Diagram

Figure 8:
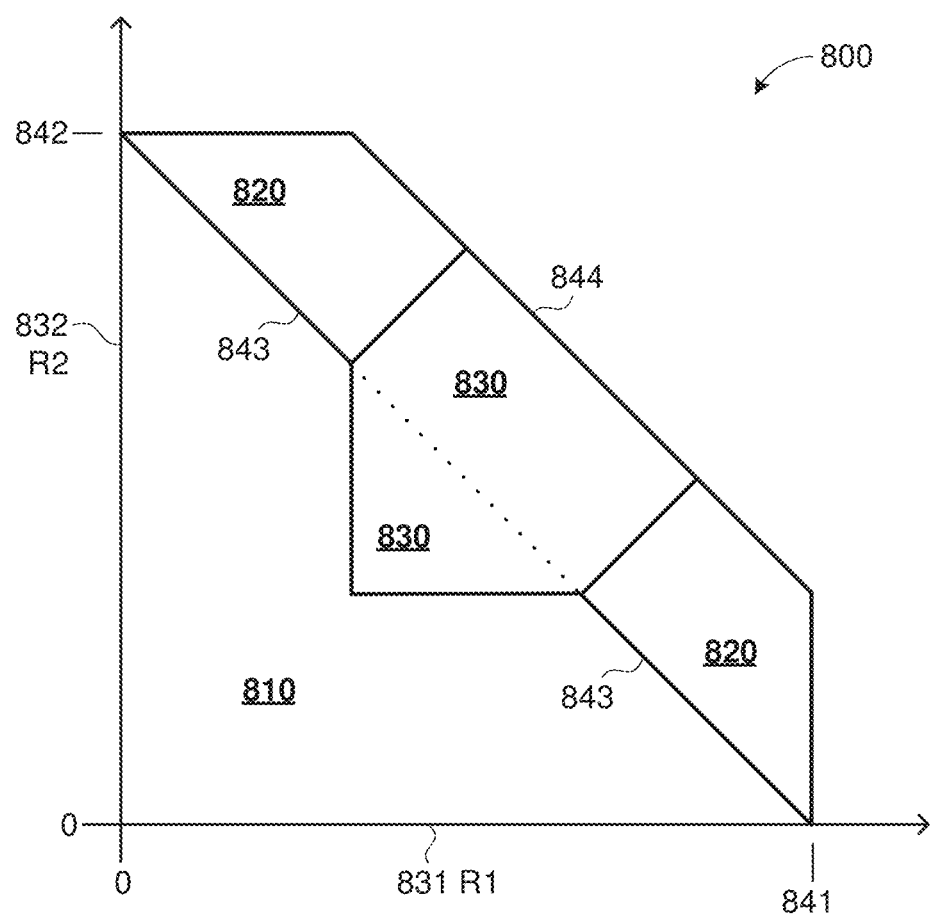
FIG. 8 is a diagram indicating operating space for examples of the disclosed technologies.

FIG. 8 is a diagram 800 indicating an example of operating space in a shared communication resource, for the disclosed technologies. The operating space is organized in two dimensions, with respective axes 831, 832 for data rates R1, R2 of two transmitters T1, T2. Along axis 831, data rate R1 can vary from 0 to a maximum 841, the maximum data rate R1 being set by the Shannon capacity limit, proportional to $$\log_2\left(1 + \frac{P1}{N0}\right),$$

where P1 is the signal power from T1 and N0 is the noise floor. Similarly, along axis 832, data rate R1 of transmitter T2 can vary from 0 to a maximum 842 proportional to $$\log_2\left(1 + \frac{P2}{N0}\right),$$

where P2 is the signal power from T2. Diagonal line 843 corresponds to the capacity limit under orthogonal allocation of the shared resource. For example, using TDMA, A % of the shared resource could be allocated to transmitter T1 and (100−A) % could be allocated to transmitter T2. As A varies from 0 to 100, the achievable data rates can vary from (0, 842) to (841, 0) along the line 843.

Line 844 corresponds to an overall capacity limit proportional to $$\log_2\left(1 + \frac{P1 + P2}{N0}\right),$$

i.e. with both transmitters transmitting in the same communication slots. The operating space between lines 843, 844 can be accessible through non-orthogonal techniques such as those disclosed herein. In regions 820, a significant difference in power levels between transmitters T1, T2 allows a Successive Interference Cancellation (SIC) technique to be used. However, in region 830, the SIC technique has difficulty discriminating between signals of comparable power levels. The present disclosed technologies have no such limitation, and provide superior performance throughout the region 830. Simulations were conducted for a zero-mean Gaussian channel, with two transmitters each operating at SNR of 10 dB. The Chitchat embodiment of the disclosed technologies, described further below, yielded a BER of 0.007. Under the same conditions, SIC yielded a BER of 0.253. In this simulation experiment, the disclosed technologies provided 36 times lower BER than SIC.

As shown in FIG. 8, region 830 extends below and to the left of line 843. Because of coding gain, the disclosed technologies can provide performance superior to simple orthogonal partition of the communication resource.

Example System

Figure 9:
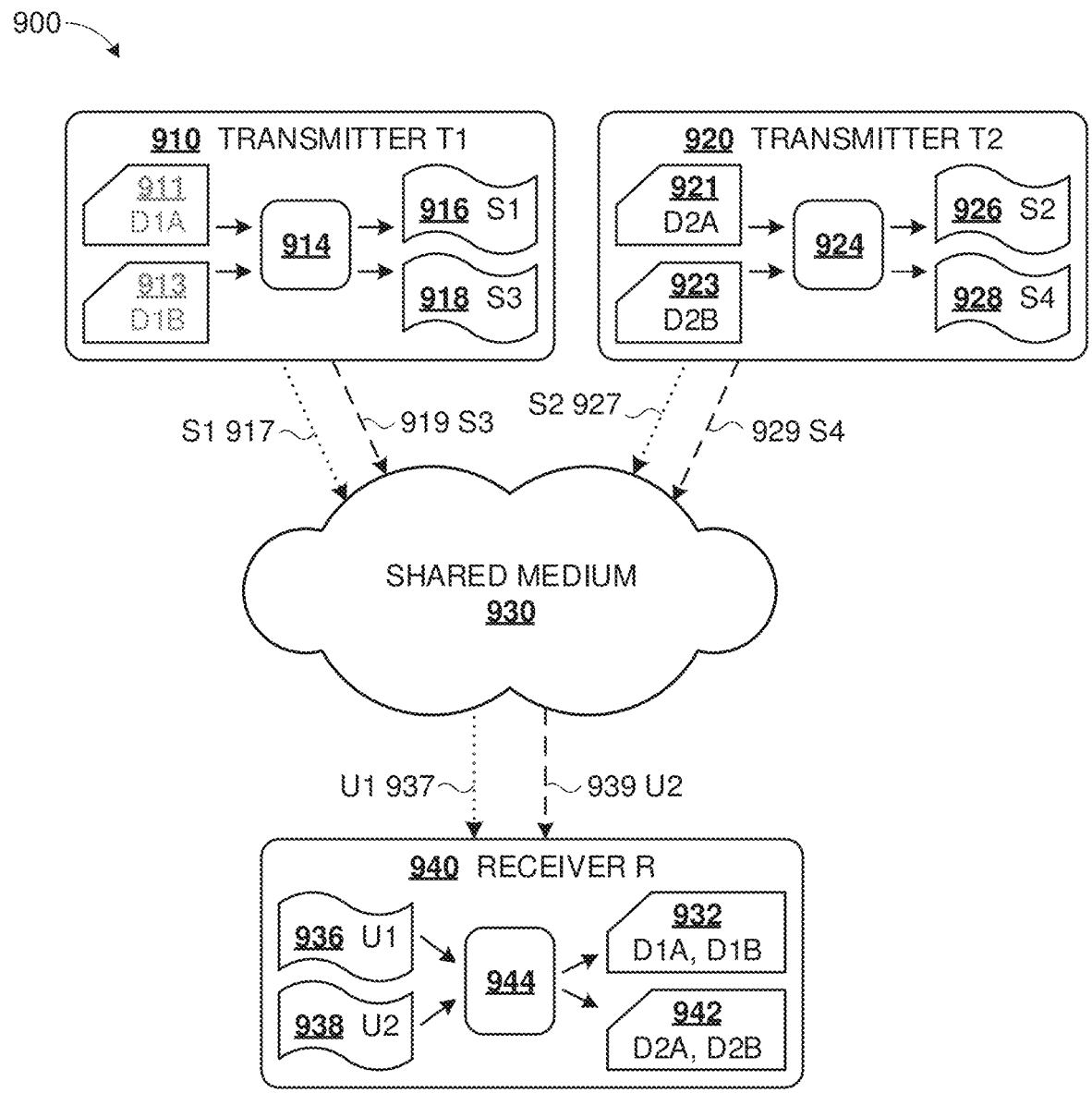
FIG. 9 is a block diagram of an example system in which examples of the disclosed technologies can be implemented.

FIG. 9 is a block diagram of an example system 900 in which examples of the disclosed technologies can be implemented. In this system, distinct transmitters T1 910 and T2 920 communicate to a receiver R 940 over two distinct communication slots through a shared medium 930.

As shown, transmitter T1 910 has a signal processing chain 914 which receives and encodes data input symbols D1A 911, D1B 913, and generates distinct signals S1 916 and S3 918 incorporating the encoded data. Signal S1 can be transmitted by transmitter T1 910 in a first communication slot as shown by dotted line arrow 917, and signal S3 can be transmitted in a second communication slot as shown by dashed line arrow 919.

In like manner, transmitter T2 920 has a signal processing chain 924 which receives and encodes data input symbols D2A 921, D2B 923, and generates signal S2 926 and signal S4 928 incorporating the encoded data symbols. Signal S2 926 can be transmitted by transmitter T2 920 in the first communication slot as shown by dotted line arrow 927 and signal S4 928 can be transmitted in the second communication slot as shown by dashed arrow 929. In some examples, signal S4 928 can be identical to signal S2 926, while in other examples signals S2 926, S4 928 can be distinct.

Propagating through shared medium 930, distinct signals S1, S2 in the first communication slot can be superimposed to form a superposition U1 which can be received by receiver R 940 as shown by dotted line arrow 937. In like manner, distinct signals S3 and S4 in the second communication slot can be superimposed to form a superposition U2 which can be received by receiver R 940 as shown by dashed line arrow 939.

The description continues with additional aspects and details of system 900.

1. Signal Processing

Signal processing chain 914 can include baseband, IF, or RF components for encoding, modulation, upconversion, filtering, amplifying, or other processing functions. In some examples, signals S1 916 and S3 918 can have a first phase rotation relative to one another. The encoding can include: combining values of data input symbols D1A 911, D1B 913 to generate distinct output symbols D1, D3; encoding output symbol D1 into signal S1 916; and encoding output symbol D3 into signal S3 918. For additional diversity as described herein, the generation of signal S3 918 can include applying an additional phase rotation relative to signal S1 916. Combining input symbols to generate distinct output symbols can include applying a first data rotation code.

Similar to transmitter T1 910, the encoding performed by signal chain 924 can include: combining values of data input symbols D2A 921, D2B 923 to generate distinct output symbols D2, D4; encoding output symbol D2 into signal S2 926; and encoding output symbol D4 into signal S3 928. Combining input symbols to generate distinct output symbols can include applying a second data rotation code. In some examples, the first and second rotation codes can be the same, but this is not a requirement.

In some examples, signal S4 928 can have a second phase rotation relative to signal S2 926, while in other examples the second phase rotation can be zero, and non-zero phase rotation can be applied only between signals S1 916 and S3 918. Generally, the first and second phase rotations can be distinct and can differ by about 90° or about 117°. For example, the second rotation can be 0° and the first rotation can be 117°. Other than differences in specific rotation applied, the functionality of signal processing chain 924 can be generally similar to the functionality of chain 914.

As shown, receiver R 940 has a signal processing chain 944 which receives and decodes superpositions U1 936 and U2 938 to detect the data input symbols D1A, D1B 932 and D2A, D2B 942 encoded therein. Generally, detected data D1A, D1B 932 and detected data D2A, D2B 942 will match the original data D1A 911, D1B 913, D2A 921, D2B 923. Signal processing chain 944 can include baseband, IF, or RF components for downconversion, demodulation, decoding, filtering, amplifying, or other processing functions. In some examples, superpositions U1 936 and U2 938 can be used jointly to recover data symbols D1A, D1B 932 and D2A, D2B 942, while in other examples, one of the superpositions 936, 938 can be used on its own to detect data symbols 932, 942, while the other superposition can be excluded from data recovery.

2. Performance

The performance of the system 900 as described above can be compared to a comparative configuration in which transmitter T2 920 is idle in the first communication slot and transmitter T1 910 is idle in the second communication slot, so that S1 alone is transmitted during the first communication slot and S2 alone is transmitted in the second communication slot. In the comparative system, receiver R 940 can decode data 932 from received S1 and can separately decode data 942 from received S2. System 900, as described above, can provide a coding gain of about 3 dB relative to the comparative configuration. In varying examples, the coding gain can be in a range 1-5 dB, 2-4 dB, or 2.5-3.5 dB.

3. Variations

Numerous variations, extensions, and use cases of the described system can be implemented. In varying examples, the difference between the first phase rotation and the second phase rotation can be in a range 70° to 140°, in a range 60° to 150°, in a range 80° to 130°, in a range 85° to 95°, in a range 114° to 120°, in a range 110° to 125°, or in a similar range. In varying examples, the first and second communication slots can occupy the same frequency bin and distinct time intervals; the same frequency bin and the same time interval with different spreading codes; the same time interval but different frequency bins; or can have a combination of two or more distinguishing attributes.

Although system 900 is illustrated from the perspective of unidirectional communication among three communication devices 910, 920, 940, the disclosed technologies are not so limited. In varying deployment scenarios, bidirectional communication can be supported, or any one or more of the illustrated devices 910, 920, 940 can also communicate with additional devices (not shown) using additional communication slots.

4. Use Cases

In some examples, transmitters T1 910 and T2 920 can be telephones, and receiver R 940 can be a telephony base station or general purpose access point. In additional examples, transmitters T1 910 and T2 920 can be IoT sensors such as video cameras, automotive sensors, or process control monitors, and receiver R 940 can be a wireless video receiver. In further examples, transmitters T1 910 and T2 920 can be IoT annunciators of respective products in a retail environment, and receiver R 940 can be a customer's smartphone. In other examples, system 900 can be used for collision avoidance or self-driving vehicles, with transmitters T1 910 and T2 920 and receiver R 940 mounted on respective proximate vehicles.

First Example Method

Figure 10:
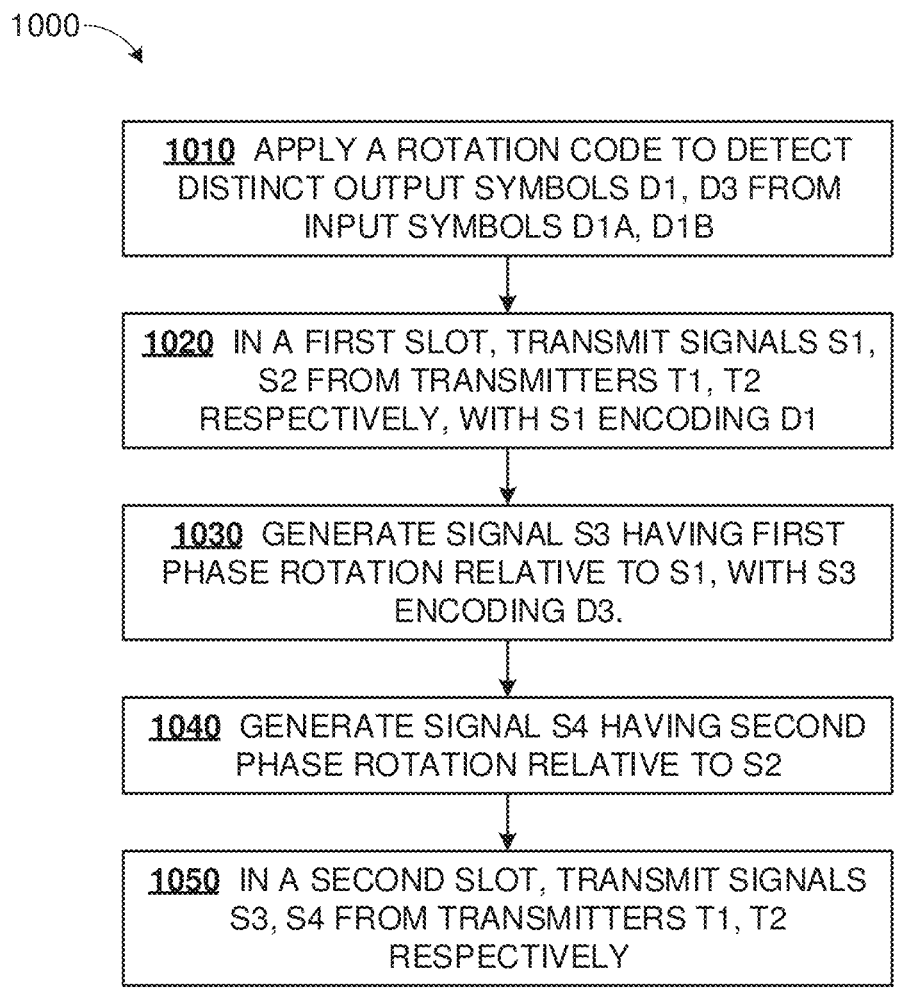
FIG. 10 is a flowchart of a first example method according to the disclosed technologies.

FIG. 10 is a flowchart 1000 of a first example method. In this method, a transmitter transmits two signals, having a relative phase rotation, in distinct first and second communication slots respectively. Both signals encode the same source data symbols. This method can be practiced by a transmitter similar to 910 of FIG. 9.

At process block 1010, a data rotation code can be applied to two input symbols D1A, D1B to generate distinct output symbols D1, D3. That is, each of D1, D3 can encode both symbols D1A, D1B. In an example where D1A, D1B are single bits, each of D1 and D3 can have four possible levels or values.

At process block 1020, distinct first and second signals (e.g. S1 and S2 of FIG. 9) can be transmitted in a first communication slot from respective first and second transmitters. At process block 1030, a third signal (e.g. S3 of FIG. 9) can be generated having a first phase rotation relative to the first signal. At process block 1040, a fourth signal (e.g. S4 of FIG. 9) can be generated having a second phase rotation relative to the second signal. The first and second phase rotations can be distinct, and the difference between the first phase rotation and the second phase rotation can be about 90°, about 117°, or can be in a range of 70° to 140°. At process block 1050, the third and fourth signals (S3, S4) can be transmitted in a second communication slot from the first and second transmitters respectively.

Numerous variations and extensions of this method can be implemented. For example, process blocks 1010-1050 can be performed in diverse orders. Block 1030 can be performed prior to the transmission of block 1020, and can be performed concurrently or in sequence with generation of the first signal (S1). Similarly, block 1040 can be performed prior to blocks 1020 or 1030. Particularly, where the second phase rotation is zero, block 1040 can generate the second and fourth signals (S2, S4) together, prior to block 1020. While in some examples the second communication slot occurs at a time interval later than the first time interval, this is not a requirement. In other examples, the second communication slot can precede the first communication slot, or the first and second communication slots can overlap in time, being distinguished by frequency bin, spreading code, or another attribute.

In further examples, signals S2 and S4 transmitted from the second transmitter can each encode a same pair of input data symbols D2A, D2B. A data rotation code can be applied to symbols D2A, D2B to obtain output symbols D2, D4, each of which encodes both input symbols D2A, D2B. Thus, where each input symbol has N values, each output symbol of a data rotation code can have $N^2$ values. In varying examples, the rotation codes implemented at the first and second transmitters can be the same or can be different.

The first and second communication slots can be distinguished by one or more of time interval, frequency bin, or spreading code, in any combination. In contrast, the first and second signals in the first communication slot can be transmitted in the same frequency bin, the same time interval and, in scenarios where spreading codes are used, with the same spreading codeword. That is, the first and second signals in the first communication slot can be indistinguishable based on frequency separation, time separation, or codeword separation.

As described herein, the first or second phase rotation can correspond to a phase rotation of points on a constellation diagram. In some examples, the second phase rotation can be zero, the two communication slots can be distinguished by time interval, and the fourth signal can be identical to the second signal. In other examples, the second phase rotation can be zero, but the two communication slots can be distinguished by spreading code or frequency bin, and accordingly the second and fourth signal can differ.

In some examples, one or more of the transmitted signals can be encoded at a double symbol rate. That is, two successive baseband symbols can be encoded into a single symbol period of the transmitted signal. In some examples, a baseband symbol can be a bit, and a transmitted signal can employ quaternary amplitude phase keying (4-APK) having four states.

In order to pair the two transmitters and establish values of the first and second phase rotations, a protocol can be negotiated between the distinct first and second transmitters. Responsive to negotiation, the first transmitter can be configured to transmit the first and third signals with the relative first phase rotation. The second transmitter can be configured to transmit the second and fourth signals with the relative second phase rotation, which can be zero in some examples. In addition to setting rotation values and roles of each transmitter, the negotiated protocol can also assign recurring communication slots to the two transmitters, which can aid in mitigating or avoiding collisions with other transmitters using a common shared medium. Particularly, distinct trains of communication slots can be assigned to respective pairs of transmitters.

In additional examples, the first and second transmitters can transmit respective first and second preambles in one or more preamble intervals. The first and second preambles can be distinguishable based on time or coding. The symbols encoded within the first and second preambles can be same or different. For example, the first preamble can be transmitted in a first portion of the preamble interval, while the second preamble can be transmitted in a second portion of the preamble interval distinct from the first portion. As another example, the first and second preambles can be overlapping in time but can be offset by half a symbol period from each other, allowing each preamble to be unambiguously distinguished. As a further example, the first and second preambles can be spread with different spreading codewords.

Second Example Method

FIG. 11 is a flowchart 1100 of a second example method. In this method, a receiver receives two distinct signal superpositions in respective distinct communication slots and extracts the respective data encoded in the individual superimposed signals. This method can be practiced by a receiver similar to 940 of FIG. 9.

At process block 1110, a first superposition U1 of signals S1, S2 can be received from respective transmitters T1, T2. Signal S1 can encode a combination D1 of two input symbols D1A, D1B. At process block 1120, a second superposition U2 of signals S3, S4 can be received from the distinct transmitters T1, T2. Signal S3 can encode a combination D3 of the same two input symbols D1A, D1B. However, combinations D1, D3 can be distinct. Signal S3 can additionally have a first phase rotation relative to signal S1, and signal S4 can have a second phase rotation relative to signal S2. The first and second phase rotations can be distinct, and a difference between the first and second phase rotations can be in a range 80° to 130°. At process block 1130, data D1 encoded in signal S1 and data D2 encoded in signal S2 can be extracted from one or both of the first superposition U1 and the second superposition U2. The extracted data D1 can include both symbols D1A, D1B.

Numerous variations and extensions can be implemented. Generally, signals S1-S4 can be distinct, however in some examples, with the second rotation equal to zero, the signal S4 can be identical to the signal S2. The first and second communication slots can be distinguishable based on one or more of frequency bin, time interval, or spreading codeword. The combinations D1, D3 can be obtained by applying a data rotation code to input symbols DIA, D1B as described herein. Each combination D1, D3 can be a respective transform of the pair of input symbols D1A, D1B. Combinations D1, D3 can be distinct from each other. In examples, the two rotation transforms can be orthogonal.

In a preamble period of the first communication slot, first and second preambles can be received respectively from the transmitters T1, T2. The first and second preambles can be distinguishable based on time separation, timing structure, or different spreading codewords. The symbols encoded in the two preambles can be same or different. The first preamble can be detected and analyzed to determine one or more offsets characteristic of the first signal S 1. The offset(s) can include one or more of a carrier frequency offset (CAFO), a sampling frequency offset (SFO), or a sampling time offset (STO). A signal processing chain in an instant receiver can be configured to apply the determined offset(s) for detection of the first signal. Thereafter, the first signal can be detected using the applied offset(s).

In other examples, the first and second preambles can be received and used to identify constellation points $\{C1\}$ of the first superposition U1, each constellation point $Ci \in \{C1\}$ corresponding to respective data values $D1i, D2i$ of the first and second signals S1, S2. For extracting data D1, D2, a first position of the received superposition U1 can be determined relative to the constellation points $\{C1\}$, and a given constellation point $Cj \in \{C1\}$ can be determined proximate to the position of U1. Then, $D1j, D2j$ corresponding to point Cj can be identified as detected values of data D1, D2 in signals S1, S2 respectively.

In additional examples, the distinguishable first and second preambles can be received and detected. First constellation points $\{C1\}$ of the first superposition U1 can be determined based on the detected preambles as described above. Similarly, second constellation points $\{C2\}$ of the second superposition U2 can also be determined. Then, a first position P1 of received superposition U1 can be determined relative to the first constellation $\{C1\}$ and a second position P2 of received superposition U2 can be determined relative to the second constellation $\{C2\}$. A combined code of data encoded in signals S1, S2 can be estimated jointly based on the first and second positions and the first and second constellation points $\{C1\}, \{C2\}$. In some examples, a maximum likelihood estimate can be used. In further examples, each possible combined code $\langle D1k, D2m \rangle$ can have distances $X1km = |P1 - C1km|$ and $X2km = |P2 - C2km|$ from the received or measured positions P1, P2 on respective constellation diagrams. Then, the determined value of the combined code can be that combination $\langle D1k, D2m \rangle$ that minimizes $X1km + X2km$.

Example Signal Chain

Figure 12:
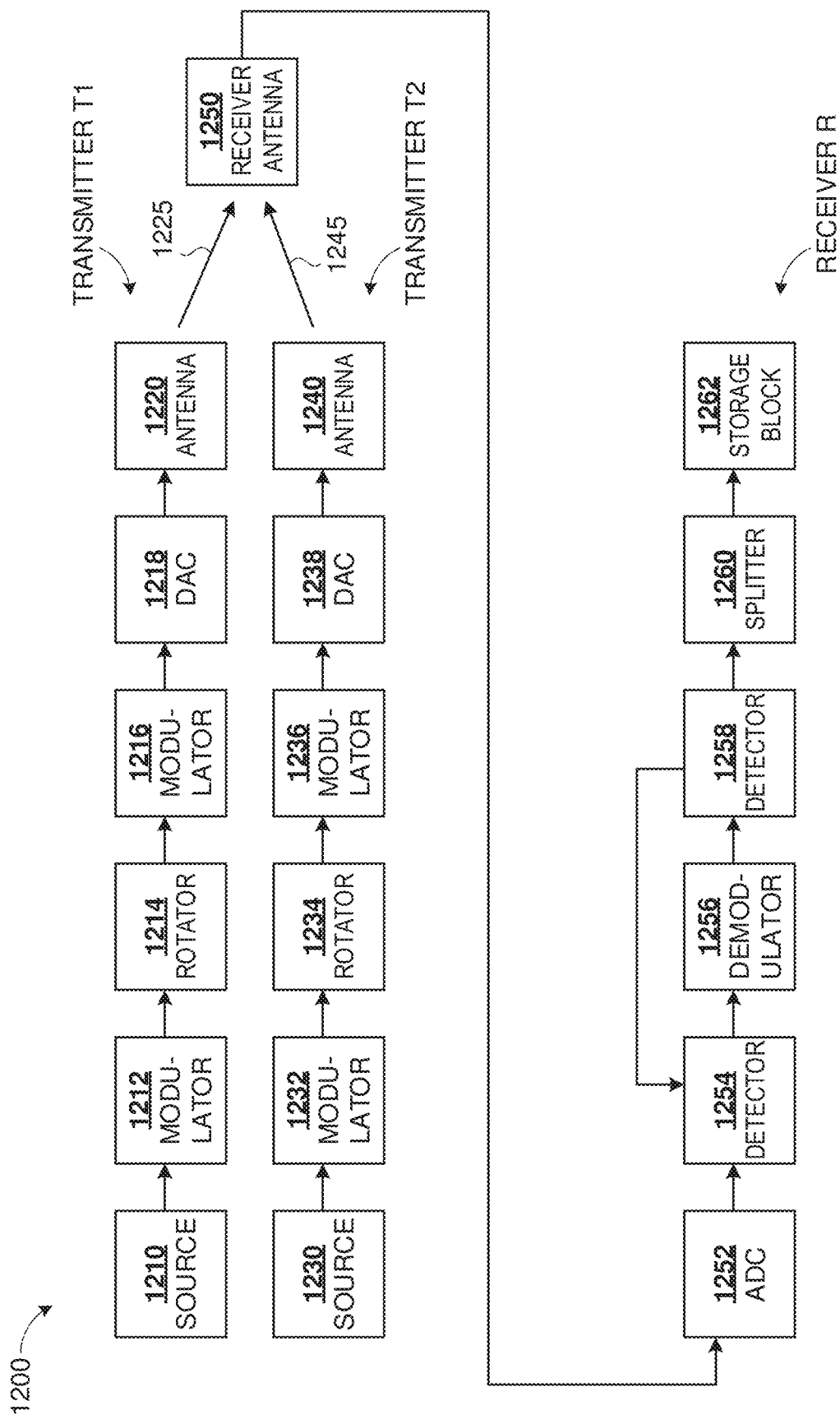
FIG. 12 is a block diagram illustrating signal processing in an example of the disclosed technologies.

FIG. 12 is a block diagram 1200 illustrating an exemplary signal processing chain. Two transmitters T1, T2 encode respective data and transmit to a receiver R in shared communication slots. Receiver R decodes the received signals and extracts the respective data sent by each transmitter.

The signal processing chain of transmitter T1 is depicted in simplified form as blocks 1210-1220. Blocks 1230-1240 can provide similar signal processing in transmitter T2. Respective transmissions 1225, 1245 from transmitters T1, T2 can be received superimposed at antenna 1250 of receiver R, which has additional signal processing components depicted in simplified form as blocks 1252-1262.

Starting with transmitter T1, source 1210 provides data to be transmitted from transmitter T1 to receiver R. Modulator 1212 can apply initial modulation. For example, input data (0, 1) can be level shifted to BPSK amplitudes (−1, 1). Rotation block 1214 can apply one or two rotation codes to the output of modulator 1212. Particularly, the rotations of Equations (1)-(2) can be combined:

$$\begin{bmatrix} D1 \\ D3' \end{bmatrix} = \begin{bmatrix} 1 & 0 \\ 0 & e^{j\Delta\gamma} \end{bmatrix} \begin{bmatrix} \cos\theta & -\sin\theta \\ \sin\theta & \cos\theta \end{bmatrix} \begin{bmatrix} D1A \\ D1B \end{bmatrix} \quad (3)$$

where D1A and D1B can be represented in complex form as (1, 0) or (−1, 0) for binary values 1, 0 respectively.

Modulator 1216 can prepare the rotation coded data for transmission. In some examples, an inverse Fourier transform (IFFT) block can prepare data for transmission using orthogonal frequency division multiplexing (OFDM), but this is not a requirement, and other modulation blocks can be used. Block 1218 can perform digital to analog conversion (DAC). Filtering, amplification, and upconversion can be performed alongside and are not shown separately in FIG. 12. Finally, a signal can be emitted from antenna 1220.

The transmit signal chain 1230-1240 for transmitter T2 is similar. In some examples, transmitter T2 can omit phase rotation between first and second communication slots. In such examples, rotation block 1234 can operate according to Equation (4), $$\begin{bmatrix} D2 \\ D4' \end{bmatrix} = \begin{bmatrix} \cos\theta & -\sin\theta \\ \sin\theta & \cos\theta \end{bmatrix} \begin{bmatrix} D2A \\ D2B \end{bmatrix} \quad (4)$$

where D2A and D2B can be represented in complex form as (1, 0) or (−1, 0) for binary values 1, 0 respectively. The remaining blocks 1230-1232, 1236-1240 can be similar to their counterparts 1210-1212, 1216-1220, and are not described further herein.

Turning to the receiver, the output of antenna 1252 can be digitized by analog to digital converter 1254. Filtering, downconversion, and amplification can be performed alongside, and are not separately shown in FIG. 12. Detector 1254 can perform symbol framing, channel estimation, and offset tracking, providing a block of symbols to demodulator 1256. In some examples, the demodulator can include a Fourier transform block (FFT) to recover data from OFDM subcarriers, but this is not a requirement, and other demodulators can also be used, complementary to modulators 1216, 1236. Then, detector 1258 can identify a constellation point most closely matching the incoming data. In some examples, a maximum likelihood estimator can be used. Particularly, for joint detection from two communication slots, the matching constellation point can be chosen to minimize the sum of distances to points representing the measured superimposed signal in each of the communication slots. The matching constellation point corresponds to values for each of four symbols, two from each of transmitters T1, T2. The data can be split into separate streams for transmitters T1, T2 at block 1260, and stored under program control at block 1262.

A feedback path from detector 1258 to detector 1254 enables feedback tuning of detector 1254, so as to minimize distances between points measured from incoming signals and the constellation points used as reference by detector 1258.

Example Packet Structure

Figure 13:
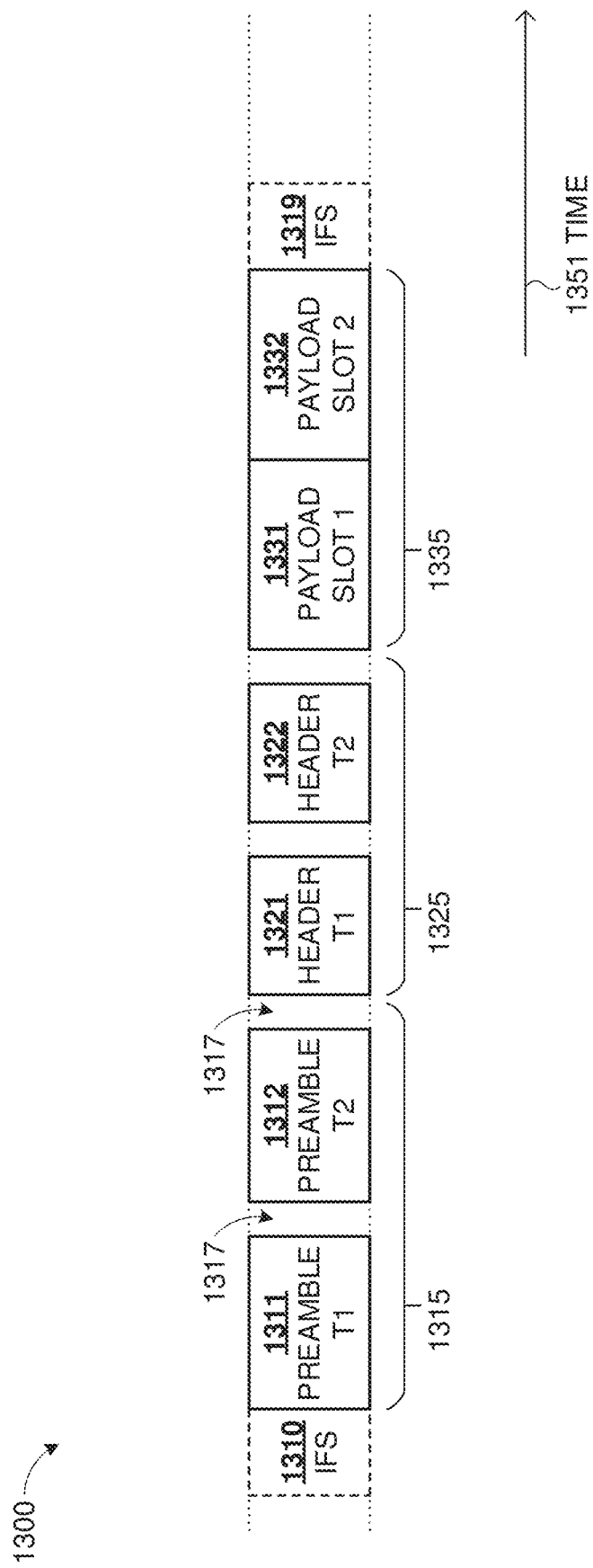
FIG. 13 is a diagram of an example packet organization which can be used with the disclosed technologies.

FIG. 13 is a diagram 1300 of an example packet organization which can be used with the disclosed technologies. A packet is organized as a temporal sequence of fields between leading and trailing interframe separators (IFS) 1310, 1319. Time axis 1351 is shown for reference. The temporal extent of the fields is not to scale.

In this illustration, preamble interval 1315 can be partitioned into subintervals 1311, 1312 allocated to transmitters T1, T2 respectively. That is, the preamble interval 1315 can be time multiplexed between transmitters T1, T2, allowing each transmitter's offsets and constellation points to be evaluated without interference from the other transmitter. In some examples, header period 1325 can also be time multiplexed between transmitters T1, T2, while in other examples, the headers can be treated in the same manner as payload data, using one or more data rotations and one or more phase rotations. Because of the time multiplexing of the preamble and header intervals, short inter-field gaps 1317 can be inserted between fields to avoid collisions due to timing mismatch between transmitters T1, T2.

The first and second communication slots described herein can be implemented as successive time intervals within the payload period 1335, similar to slots 211, 212 of FIG. 2. In some examples, an inter-field gap 1317 can be included between payload slots 1331, 1332, while in other examples (and as shown) such an inter-field gap can be omitted, because both transmitters can be expected to transmit during both slots 1331, 1332.

Example Performance

Figure 14:
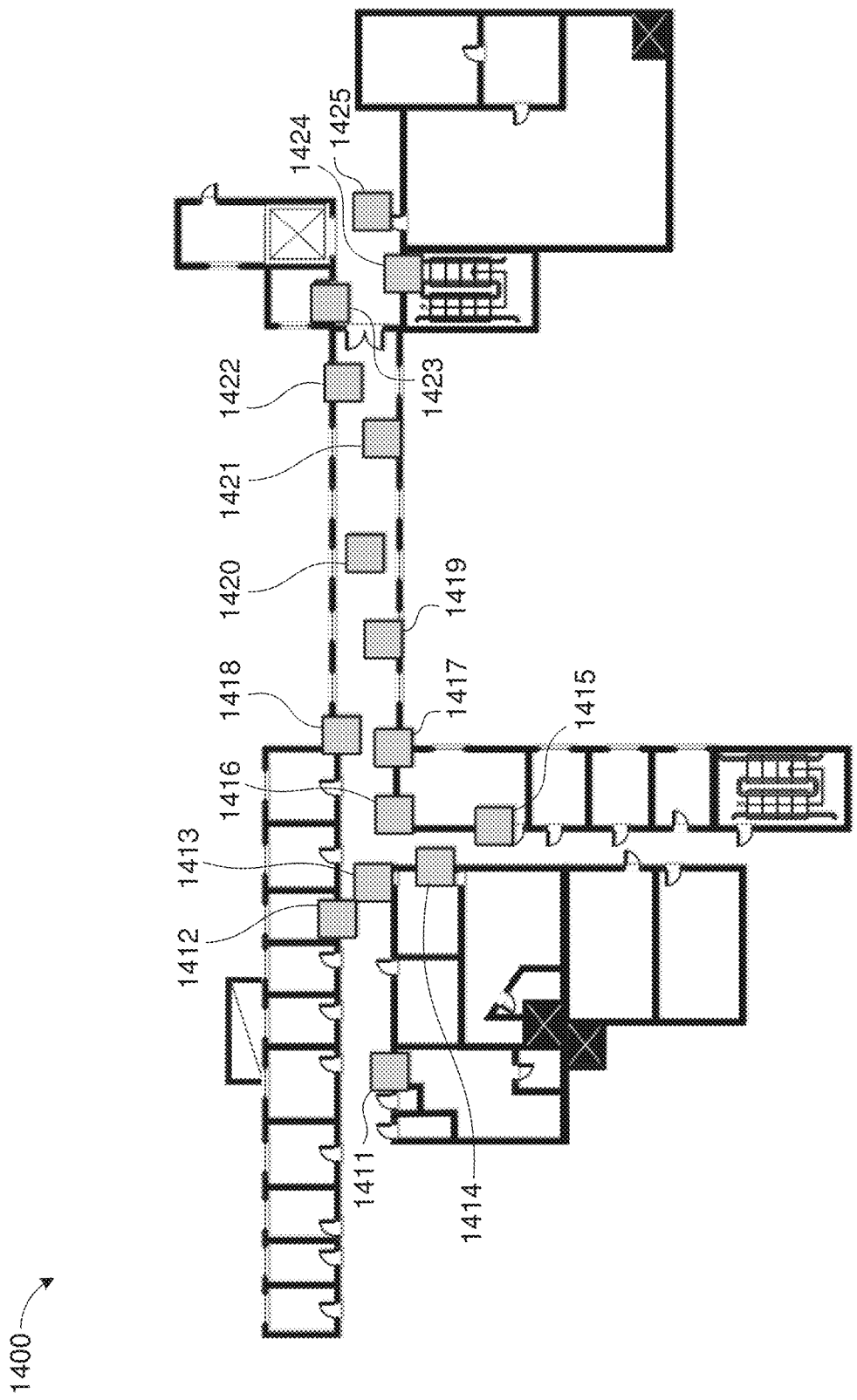
FIG. 14 is a diagram of a test site at which the disclosed technologies have been deployed.

FIG. 14 is a diagram 1400 of a test site at which the disclosed technologies have been deployed. Diagram 1400 is a floor plan of one floor of a university department building, with radios deployed at various locations 1411-1425. Each radio employs a USRP N210 software defined radio (Ettus Research, National Instruments, Austin Tex.) equipped with a XCVR2450 transceiver board (Ettus Research, id.). In various configurations, HG2458RD-SM omni-directional antennas (L-com, North Andover Mass.) with 3 dBi gain or ECOM9-5500 magnet mount WiFi antennas (Mobile Mark, Inc., Itasca Ill.) with 9 dBi gain were used. The radios were operated under IEEE 802.11p with 5.9 GHz carrier frequency and 10 MHz bandwidth, controlled by respective personal computers running Ubuntu 16.04 and implementing a GNU-radio program for generating transmitter data streams or processing receiver data streams. In one configuration, transmitters were placed at sites 1417, 1418 and a receiver was placed at 1419. In another configuration, transmitters were placed at sites 1421, 1423, and a receiver was placed at site 1420.

Figure 15A:
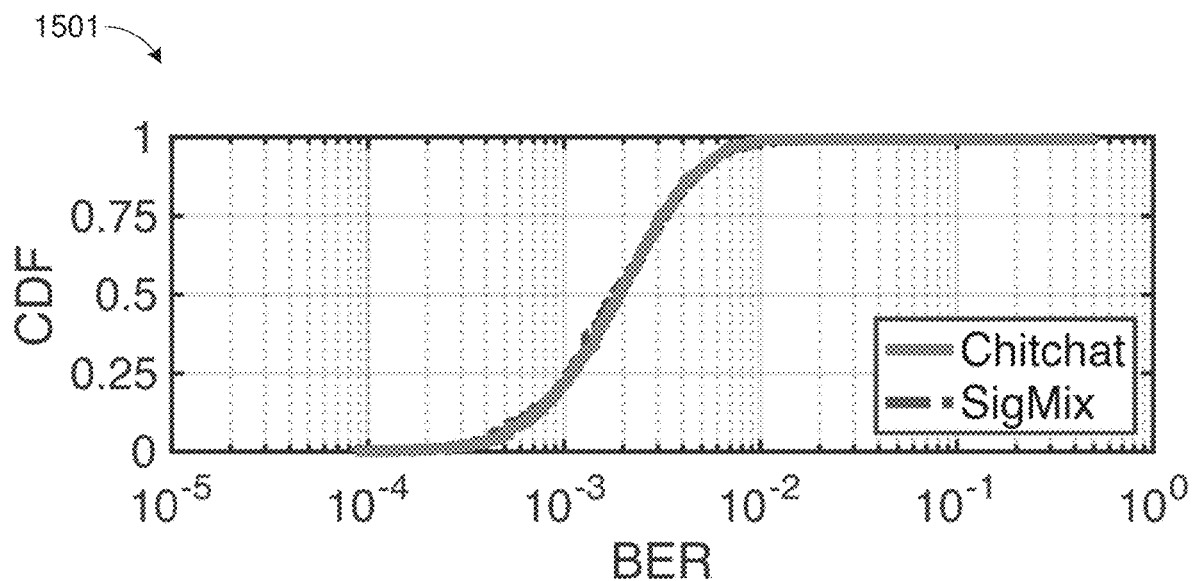
FIGS. 15A-15B are charts illustrating exemplary performance of the disclosed technologies.
Figure 15B:
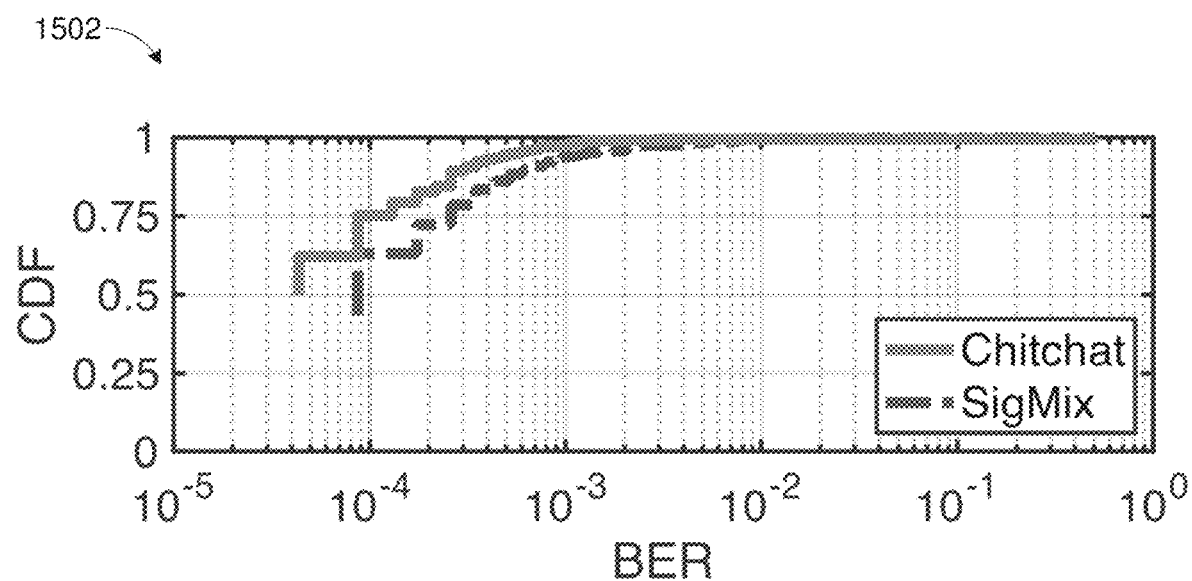

FIGS. 15A-15B are charts 1501, 1502 illustrating exemplary performance of the disclosed technologies in two different scenarios emulating a stable wireless channel. Both charts include graphs of a cumulative density distribution (CDF) of measured BER, for two different techniques. Chitchat is an embodiment of the presently disclosed techniques, following e.g. dataflow of FIG. E, with data rotations and phase rotations according to Equations (1)-(2). SigMix is a simpler technology that does not implement data rotation E15, E25. Rather, in SigMix, transmitter T1 transmits symbol E11 D1A twice, with phase rotation applied to the second time slot, while transmitter T2 transmits signal E21 D2A twice, identically. That is, SigMix operates at half the data rate of Chitchat.

In FIG. 15A, the two transmitters have SNR of 11.8 dB and 12.8 dB. The depicted BER curves are nearly indistinguishable, showing that the present Chitchat technology can match SigMix error performance at relatively low SNR, while delivering twice the data rate. In FIG. 15B, the two transmitters have SNR of 14.9 and 16.4 dB. With better SNR compared to FIG. NA, Chitchat has a BER 4.3 $10^{-5}$, about half that of SigMix, demonstrating better coding gain as well as better spectral efficiency.

Figure 16A:
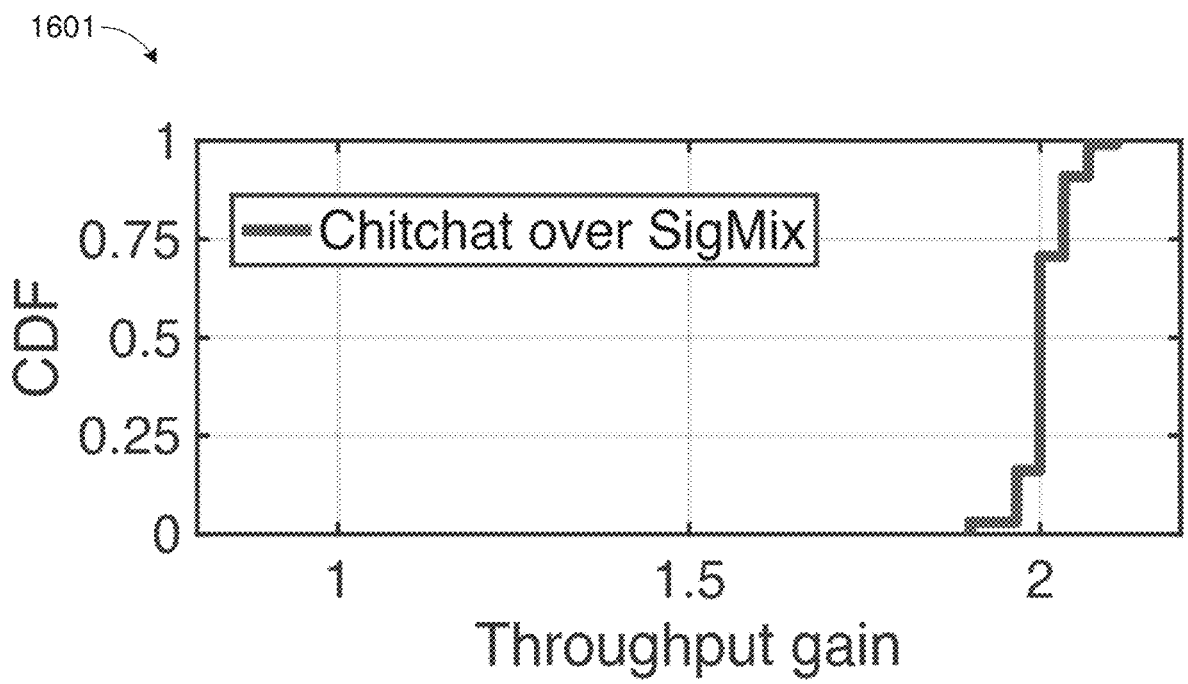
FIGS. 16A-16B are charts illustrating exemplary performance of the disclosed technologies.
Figure 16B:
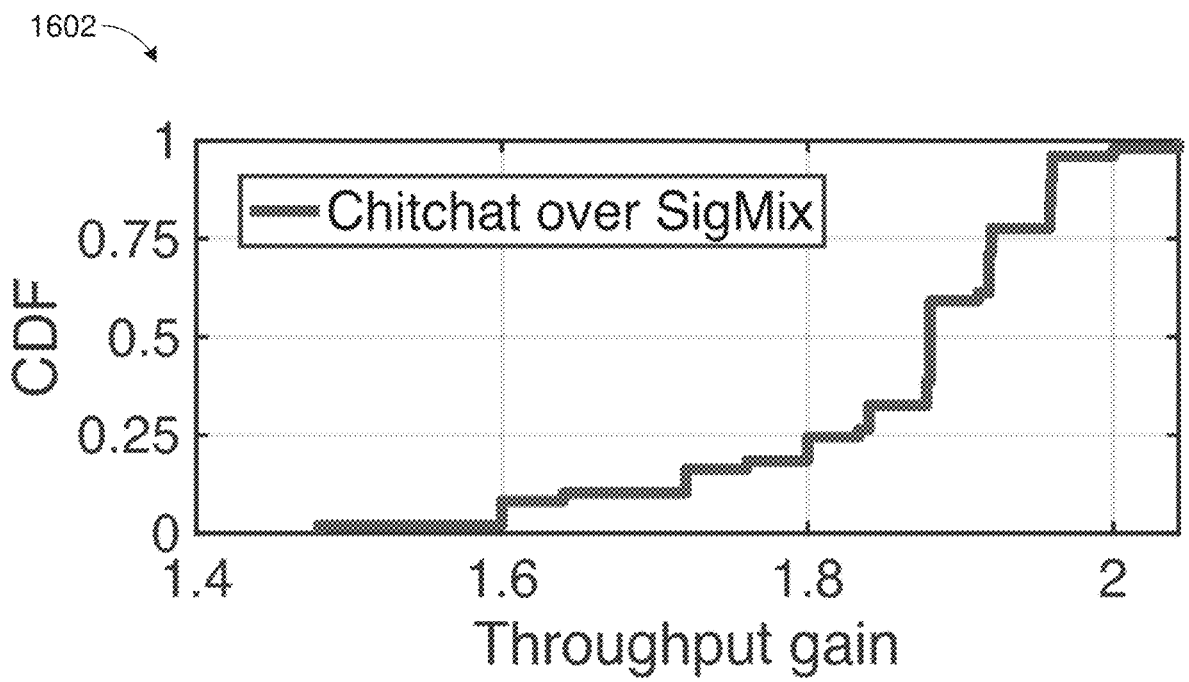

FIGS. 16A-16B are charts 1601, 1602 illustrating exemplary performance of the disclosed technologies in static and dynamic environments. FIG. 16A shows a cumulative distribution function of throughput ratio between Chitchat and SigMix in a static environment. Chitchat is seen to provide 2× throughput compared to SigMix, because of the coding E15, E25. For FIG. 16B, a dynamic environment was set up at the site shown in FIG. 14. During the test run, people walked around the test site, including between transmitters and receiver, as part of routine activities, causing significant dynamic disturbances to the transmission paths. FIG. 16B shows a cumulative distribution function of throughput ratio between Chitchat and SigMix in this dynamic environment. The relative throughput can be seen to drop about 6%, with Chitchat still providing 1.88× throughput compared to Sig-Mix at 50% CDF.

A Generalized Computer Environment

Figure 17:
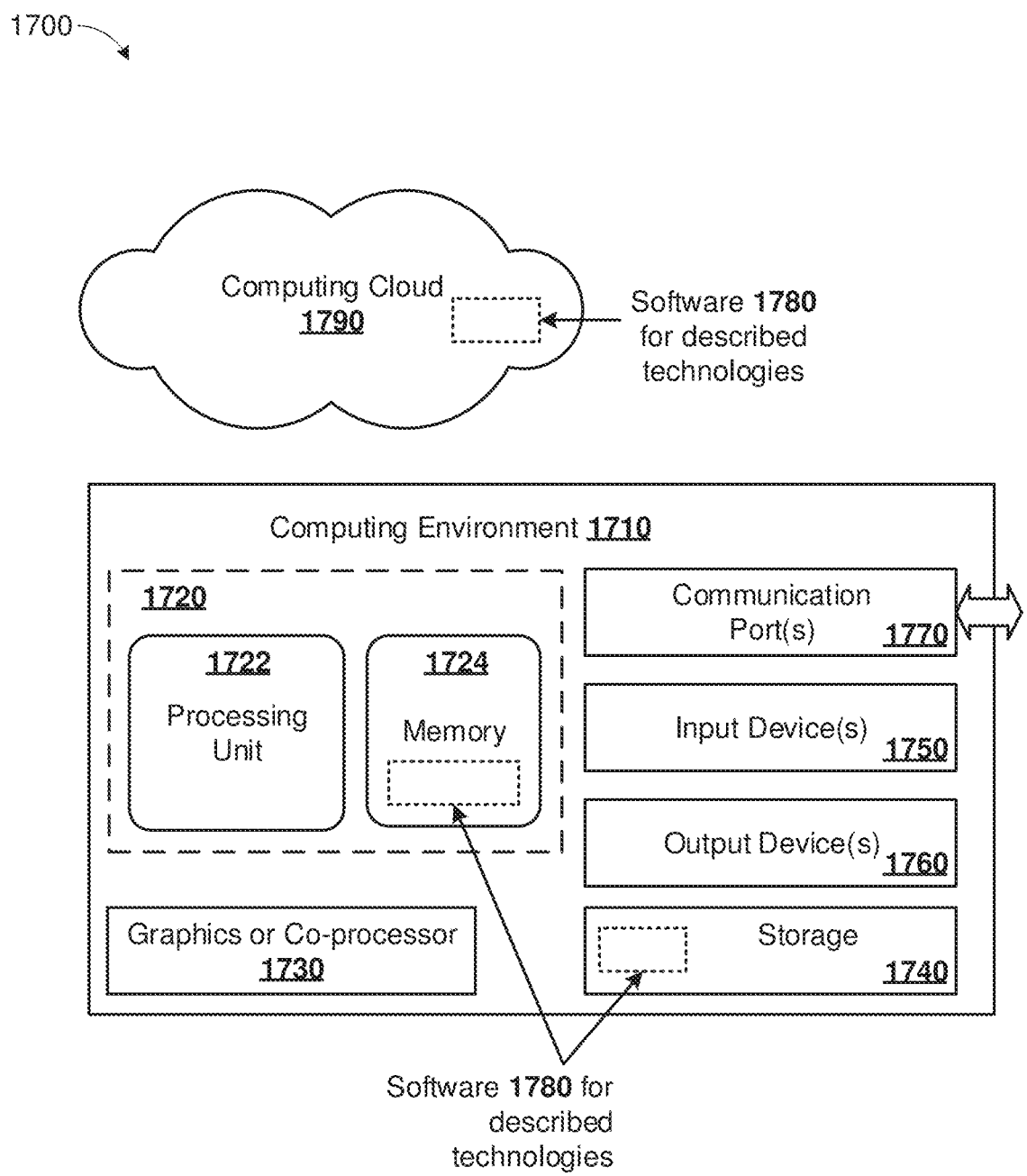
FIG. 17 is a diagram schematically depicting a computing environment suitable for implementation of disclosed technologies.

FIG. 17 illustrates a generalized example of a suitable computing system 1700 in which described examples, techniques, and technologies, including construction, deployment, operation, and maintenance of software for communication over shared communication slots can be implemented according to disclosed technologies. The computing system 1700 is not intended to suggest any limitation as to scope of use or functionality of the present disclosure, as the innovations can be implemented in diverse general-purpose or special-purpose computing systems.

With reference to FIG. 17, computing environment 1710 includes one or more processing units 1722 and memory 1724. In FIG. 17, this basic configuration 1720 is included within a dashed line. Processing unit 1722 executes computer-executable instructions, such as for implementing any of the methods or objects described herein for encoding data symbols, transmitting or receiving signals, or decoding signals or superpositions of signals; or various other architectures, software components, handlers, managers, modules, or services described herein. Processing unit 1722 can be a general-purpose central processing unit (CPU), a processor in an application-specific integrated circuit (ASIC), or any other type of processor. In a multi-processing system, multiple processing units execute computer-executable instructions to increase processing power. Computing environment 1710 can also include a graphics processing unit or co-processing unit 1730. Tangible memory 1724 can be volatile memory (e.g., registers, cache, or RAM), non-volatile memory (e.g., ROM, EEPROM, or flash memory), or some combination thereof, accessible by processing units 1722, 1730. The memory 1724 stores software 1780 implementing one or more innovations described herein, in the form of computer-executable instructions suitable for execution by the processing unit(s) 1722, 1730. The memory 1724 can also store metadata or configuration data associated with data rotation codes, phase rotations, negotiated protocols, offset detection or compensation, tuning of signal chain components, performing maximum likelihood estimates or schema associated with data objects, error correction, packet framing, wireless communication or other protocols; other configuration data, data structures including data tables, working tables, change logs, output structures, data values, indices, or flags, as well as other operational data.

A computing system 1710 can have additional features, such as one or more of storage 1740, input devices 1750, output devices 1760, or communication ports 1770. An interconnection mechanism (not shown) such as a bus, controller, or network interconnects the hardware components of the computing environment 1710. Typically, operating system software (not shown) provides an operating environment for other software executing in the computing environment 1710, and coordinates activities of the hardware and software components of the computing environment 1710.

The tangible storage 1740 can be removable or non-removable, and includes magnetic disks, magnetic tapes or cassettes, CD-ROMs, DVDs, or any other medium which can be used to store information in a non-transitory way and which can be accessed within the computing environment 1710. The storage 1740 stores instructions of the software 1780 (including instructions and/or data) implementing one or more innovations described herein.

The input device(s) 1750 can be a mechanical, touch-sensing, or proximity-sensing input device such as a keyboard, mouse, pen, touchscreen, trackball, a voice input device, a scanning device, or another device that provides input to the computing environment 1710. The output device(s) 1760 can be a display, printer, speaker, optical disk writer, or another device that provides output from the computing environment 1710.

The communication port(s) 1770 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

Particularly, communication port(s) 1770 can provide transmission or reception of data in communication slots as described herein, or can be coupled to radios or antennas. In various examples, input device(s) 1750 or output device(s) 1760 can also be interface cards, radios, or antennas.

In some examples, computer system 1700 can also include a computing cloud 1790 in which instructions implementing all or a portion of the disclosed technologies are executed. Any combination of memory 1724, storage 1740, and computing cloud 1790 can be used to store software instructions or data of the disclosed technologies.

The present innovations can be described in the general context of computer-executable instructions, such as those included in program modules, being executed in a computing system on a target real or virtual processor. Generally, program modules or software components include routines, programs, libraries, software objects, classes, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Occasionally, the term "computer" is used to refer to a computing system. Virtual processors, virtual hardware, and virtualized devices are ultimately embodied in a hardware processor or another form of physical computer hardware, and thus include both software associated with virtualization and underlying hardware.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and do not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "actuate," "analyze," "apply," "configure," "convert," "correct," "decode," "decrypt," "demodulate," "detect," "determine," "encode," "encrypt," "estimate," "evaluate," "extract," "filter," "generate," "identify," "indicate," "modulate," "multiplex," "negotiate," "obtain," "receive," "recover," "rotate," "sense," "split," "store," "transform," "transmit," "use" to indicate computer operations in a computer system. These terms denote actual operations that are performed by a computer or controlled by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 17, computer-readable storage media include memory 1724, and storage 1740. The terms computer-readable media and computer-readable storage media do not include signals and carrier waves. In addition, the terms computer-readable media and computer-readable storage media do not include communication ports (e.g., 1770) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technologies are not limited to any specific computer language or program. For instance, the disclosed technologies can be implemented by software written in ABAP, Adobe Flash, Angular, C, C++, C#, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technologies are not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method comprising:
applying, at a first transmitter, a data rotation to two input symbols to generate a first output symbol and a second output symbol, wherein the first output symbol and the second output symbol are distinct;
transmitting, as a first superposition in a first communication slot, a first signal from the first transmitter and a second signal from a second transmitter, the first signal encoding the first output symbol;
generating, at the first transmitter, a third signal encoding the second output symbol, wherein the third signal has a first phase rotation relative to the first signal;
generating, at the second transmitter, a fourth signal having a second phase rotation relative to the second signal, wherein a difference between the first phase rotation and the second phase rotation is in a range 70° to 140°; and
transmitting, as a second superposition in a second communication slot, the third signal from the first transmitter and the fourth signal from the second transmitter.

2. The method of claim 1, wherein the second phase rotation is 0°.

3. The method of claim 2, wherein the fourth signal is identical to the second signal.

4. The method of claim 1, wherein the first communication slot and the second communication slot are distinguished by having one or more of: different frequency bins, different time intervals, or different spreading codes.

5. The method of claim 1, wherein the first signal and the second signal in the first communication slot are indistinguishable based on a frequency separation, a time separation, or a spreading code separation.

6. The method of claim 1, wherein the data rotation is a first data rotation and the method further comprises:
applying, at the second transmitter, a second data rotation to generate distinct third and fourth output symbols from another two input symbols;
wherein the second and fourth signals respectively encode the third and fourth output symbols.

7. The method of claim 1, wherein each of the input symbols has N possible values, where N is a positive integer, and each of the output symbols has $N^2$ possible values.

8. The method of claim 1, further comprising:
prior to the first and second communication slots, negotiating a protocol for the first and second transmitters; and
responsive to the negotiating, configuring the first transmitter to transmit the first and third signals with the relative first phase rotation;
wherein the second transmitter is configured to transmit the second signal and the fourth signal with the relative second phase rotation.

9. The method of claim 1, further comprising:
transmitting, in a preamble interval of the first communication slot prior to the transmitting of the first and second signals, a first preamble from the first transmitter and a second preamble from the second transmitter;
wherein the first preamble and the second preamble are distinguishable based on a timing separation or based on a code separation.

10. One or more non-transitory computer-readable media storing instructions which, when executed by one or more hardware processors at a receiver, cause the hardware processors to perform operations comprising:
receiving, in a first communication slot, a first superposition of a first signal from a first transmitter and a second signal from a second transmitter;
receiving, in a second communication slot, a second superposition of a third signal from the first transmitter and a fourth signal from the second transmitter, wherein a first phase rotation between the third signal and the first signal differs from a second phase rotation between the fourth signal and the second signal by a value in a range 80° to 130°; and
extracting combined data encoded in the first signal and in the second signal from the received first superposition or from the received second superposition;
wherein the first signal encodes a first combination of two symbols, the third signal encodes a second combination of the two symbols distinct from the first combination, and the extracted combined data includes the two symbols.

11. The one or more non-transitory computer-readable media of claim 10, wherein the operations further comprise:
receiving, in a preamble period of the first communication slot, distinguishable first and second preambles having attributes characteristic of the first signal and the second signal respectively;
detecting the first preamble;
analyzing the first preamble to determine one or more offsets;
configuring a detector to apply the one or more offsets for detection of the first signal; and
detecting, with the one or more offsets, the first combination of the two symbols.

12. The one or more non-transitory computer-readable media of claim 10, wherein the first combination is a first rotation transform of the two symbols, the second combination is a second rotation transform of the two symbols, and the first rotation transform is orthogonal to the second rotation transform.

13. The one or more non-transitory computer-readable media of claim 10, wherein the operations further comprise:
receiving, in a preamble period of the first communication slot, distinguishable first and second preambles having attributes characteristic of the first signal and the second signal respectively;
detecting the first and second preambles;
responsive to the detecting, identifying first constellation points of the first superposition for respective first data values of the first signal and respective second data values of the second signal;
and wherein the extracting comprises:
detecting a first position, relative to the first constellation points, of the first superposition;
determining a given constellation point, among the first constellation points, proximate to the first position; and
identifying the two symbols from the respective first data value of the given constellation point.

14. The one or more non-transitory computer-readable media of claim 10, wherein the operations further comprise:
receiving, in a preamble period of the first communication slot, distinguishable first and second preambles having attributes characteristic of the first signal and the second signal respectively;

detecting the first and second preambles;
responsive to the detecting, identifying first constellation points of the first communication slot for respective data values of the first signal and respective data values of the second signal;
identifying second constellation points of the second communication slot;
and wherein the extracting the combined data comprises:
detecting a first position, relative to the first constellation points, of the first superposition;
detecting a second position, relative to the second constellation points, of the second superposition; and
estimating the combined data encoded in the first signal and in the second signal based jointly on the first position, the first constellation points, the second position, and the second constellation points.

15. The one or more non-transitory computer-readable media of claim 14, wherein:
the combined data is selected from among a plurality of possible values, each possible value of the combined data having respective points among the first and second constellation points at respective first and second distances from the first and second positions on respective constellation diagrams; and
among the possible values of the combined data, the estimated combined data minimizes a sum of the first and second distances.

16. A system comprising:
three communication devices comprising a first transmitter, a second transmitter, and a receiver, each of the communication devices comprising:
one or more hardware processors with memory coupled thereto;
one or more antennas coupled to the one or more hardware processors; and non-transitory computer-readable media storing instructions executable by the one or more hardware processors;
wherein the first transmitter is configured to:
apply a first data rotation to generate, from two first input symbols, a first output symbol and a second output symbol, wherein the first output symbol and the second output symbol are distinct;
encode the first output symbol as a first signal;
encode the second output symbol as a third signal; and
transmit the first signal and the third signal in a first communication slot and in a second communication slot respectively;
wherein the third signal has a first phase rotation relative to the first signal;
wherein the second transmitter is configured to:
apply a second data rotation to generate, from two second input symbols, a third output symbol and a fourth output symbol, wherein the third output symbol and the fourth output symbol are distinct;
encode the third output symbol as a second signal;
encode the fourth output symbol as a fourth signal; and
transmit the second signal and the fourth signal in the first communication slot and in the second communication slot respectively;
wherein the fourth signal has a second phase rotation relative to the second signal;
wherein a difference between the first phase rotation and the second phase rotation is in a range 60° to 150°; and
wherein the receiver is configured to receive a first superposition of the first and second signals in the first communication slot and to receive a second superposition of the third and fourth signals in the second communication slot, and to detect the two first input symbols and the two second input symbols from the first superposition and the second superposition.

17. The system of claim 16, wherein the system provides coding gain over a configuration in which the first communication slot carries the first signal with the second transmitter idle and the second communication slot carries the second signal with the first transmitter idle.

18. The system of claim 16, wherein the first and second transmitters are telephones and the receiver is an access point.

19. The system of claim 16, wherein the three communication devices are mounted upon respective vehicles.

20. The system of claim 16, wherein the first and second transmitters are Internet-of-Things (IoT) sensors.

* * * * *